United States Patent [19]

Epstein et al.

[11] Patent Number: 5,137,991
[45] Date of Patent: Aug. 11, 1992

[54] POLYANILINE COMPOSITIONS, PROCESSES FOR THEIR PREPARATION AND USES THEREOF

[75] Inventors: Arthur J. Epstein, Bexley; Jiang Yue, Columbus, both of Ohio

[73] Assignee: The Ohio State University Research Foundation, Columbus, Ohio

[21] Appl. No.: 423,902

[22] Filed: Oct. 19, 1989

Related U.S. Application Data

[63] Continuation-in-part of Ser. No. 193,964, May 13, 1988, Pat. No. 5,079,334.

[51] Int. Cl.[5] .................... C08F 299/00; C08G 81/00; C08G 73/00; C08G 75/00
[52] U.S. Cl. ................................. 525/540; 528/391; 528/422; 528/487; 252/500; 252/511; 252/518; 525/535; 359/265
[58] Field of Search .............. 525/540, 535; 252/500, 252/511, 518; 528/391, 422, 487; 350/357

[56] References Cited

U.S. PATENT DOCUMENTS

| | | | |
|---|---|---|---|
| 3,941,810 | 3/1976 | Koebner | 546/66 |
| 4,488,943 | 12/1984 | Skotheim | 204/58 |
| 4,556,623 | 12/1985 | Tamura et al. | 430/83 |
| 4,585,581 | 4/1986 | Skotheim | 252/518 |
| 4,586,792 | 5/1986 | Yang et al. | 350/357 |
| 4,604,427 | 8/1986 | Roberts et al. | 528/185 |
| 4,615,829 | 10/1986 | Tamura et al. | 252/500 |
| 4,636,430 | 1/1987 | Moehwald | 428/304.4 |
| 4,742,867 | 5/1988 | Walsh | 165/96 |
| 4,749,260 | 6/1988 | Yang et al. | 350/357 |
| 4,822,638 | 4/1989 | Yaniger | 427/79 |
| 4,851,487 | 7/1989 | Yaniger et al. | 528/391 |
| 4,855,361 | 8/1989 | Yaniger | 525/436 |
| 4,935,164 | 6/1990 | Wessling et al. | 252/500 |
| 4,973,391 | 11/1990 | Madou et al. | 204/78 |

FOREIGN PATENT DOCUMENTS 61-197633 9/1986 Japan .

OTHER PUBLICATIONS

Paul, et al., J. Phys. Chem. 89:1441–1447 (1985).
Stafstrom et al., Phys. Rev. Lett. 59:1464 (1987).
Rice et al., Phys. Rev. Lett., 49:1455 (1982).
Bredas et al., Phys. Rev., B29:6761 (1984).
Chiang et al., Synth. Met. 13:193 (1986).

(List continued on next page.)

Primary Examiner—John Kight, III
Assistant Examiner—P. Hampton-Hightower
Attorney, Agent, or Firm—Emch, Schaffer, Schaub & Porcello Co.

[57] ABSTRACT

Self-prontonated sulfonic acid-substituted polyaniline compositions, processes for their preparation and uses therefor are disclosed. The sulfonated polyaniline compositions have faster electronic and optical responses to electrochemical potentials comparing to its parent polyaniline, improved environmental stability, and improved solubility than the parent polymer, polyaniline. A process for producing the sulfonated polyaniline compositions comprises reacting the polyaniline polymer with concentrated sulfuric acid. The sulfonated polyaniline compositions are useful for switching an electrochemical response between a conducting and a nonconducting state. The sulfonated polyaniline compositions are also useful for conduction of electricity, absorption of electromagnetic radiation, modulation of electromagnetic beams and modification of the electromagnetic response of sulfonated polyaniline compositions by chemical or electrochemical means. The sulfonated polyaniline compositions are also useful as a high density erasable data storage medium for use in information storage and processing applications. The invention further provides electronic, chemical, electrochemical, and optical microelectronic devices which use and control the chemical and physical properties of the sulfonated polyaniline compositions.

13 Claims, 11 Drawing Sheets

OTHER PUBLICATIONS

Ginder et al., Solid State Commun., 63:97 (1987).
Epstein et al., Synth. Met. 18:303 (1987).
Choi et al., Phys. Rev. Met., 59:2188 (1987).
Skotheim et al., Electrochem. Soc., 132:246 (1985).
Obayashi et al., Adv. Chem. Ser., 163:316 (1977).
Sammels et al., J. Electrochem. Soc., 131:617 (1984).
Chao et al., J. Am. Chem. Soc., 109:6627 (1987).
Hardy et al., J. Am. Chem. Soc., 1071:3823 (1985).
Gregory et al., Synthetic Metals, 28:C823–C835 (1989).
Nakajima et al., Synthetic Metals, 28:C629–C638 (1989).
Mizumoto et al., Synthetic Metals, 28:C639–C646 (1989).
Angelopoulos et al., J. Vac. Sci. Technol. B7 (6) Nov./Dec. 1989.
Lacroix et al., J. Electrochem Soc., 136:1308–1313 (1989).
Chem Abstracts, 106:33982g (1987).
Noshay et al., J. App. Polymer Sci., 20:1885–1903 (1976).

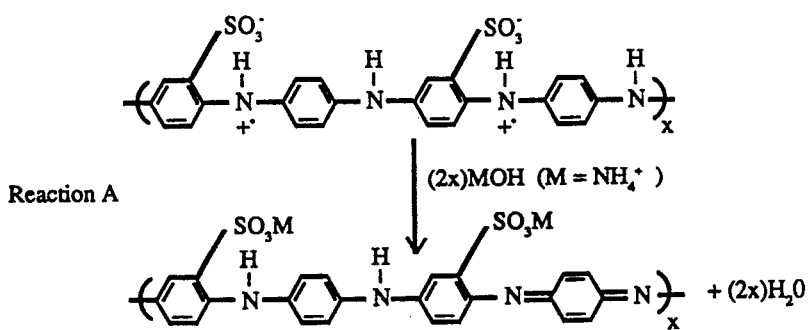
Reaction A
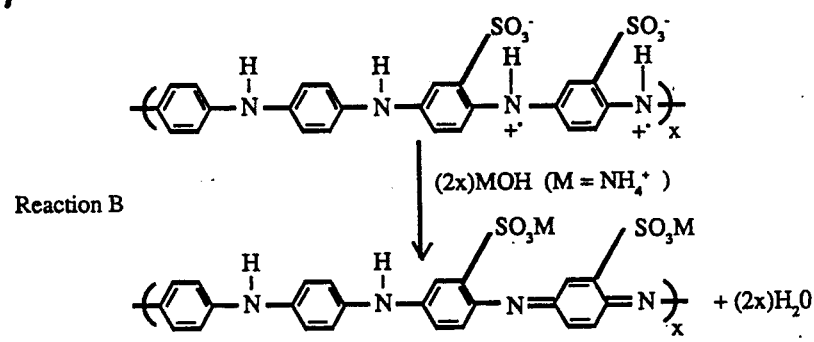
Reaction B
FIG. 7
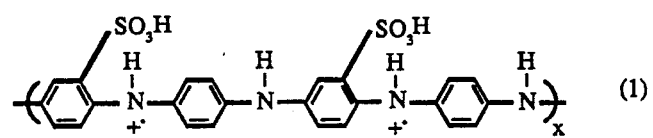 (1)
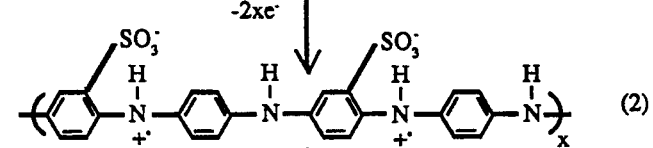 (2)
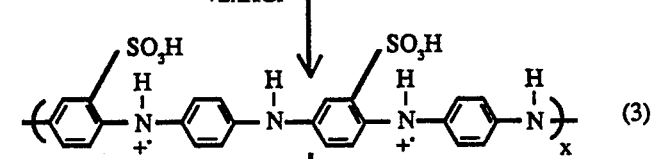 (3)
FIG. 8
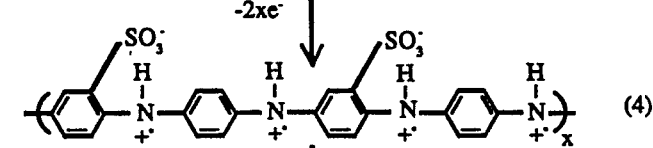 (4)
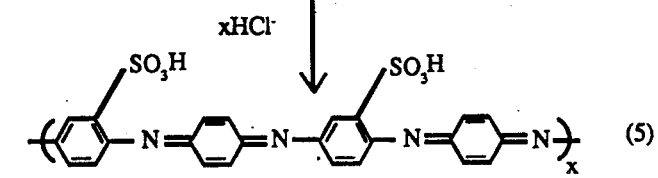 (5)

POLYANILINE COMPOSITIONS, PROCESSES FOR THEIR PREPARATION AND USES THEREOF

BACKGROUND OF THE INVENTION

The present invention is a continuation-in-part of co-pending application Ser. No. 193,964 which was filed on May 13, 1988 now U.S. Pat. No. 5,079,334.

The present invention relates to self-protonated sulfonic acid-substituted polyaniline compositions their derivatives, processes for their preparation, and uses thereof.

It is desirable in certain applications to have a material whose radiation absorption characteristics and index of refraction can be easily and reversibly modulated. Various polymeric materials have been investigated including polyacetylene, polydiacetylene, polypyrrole, poly (N-methyl-pyrrole), poly(phenylene vinylene), and polythiophene. While these polymeric materials are known to exhibit photoresponsive effects, these materials have deficiencies when considered for certain electromagnetic applications. For example, polyacetylene and polydiacetylene have limited photoresponse, are air sensitive, generally cannot be derivatized, and are not readily soluble and therefore cannot be easily deposited as a thin film from solution. In addition, most materials previously investigated for electromagnetic radiation absorption are not readily tunable, i.e., the photoresponses of the materials cannot be reversibly modulated by an external source of energy.

Organic polymers have long been studied for electronic transport and, more recently, for optical properties. The first organic polymers prepared were electrically insulating with conductivities as low as $10^{-14}$ (ohms cm)$^{-1}$. The insulating properties are the result of all the electrons in the polymer being localized in the hybrid-atom molecular orbital bonds, i.e., the saturated carbon framework of the polymer. These insulators, which include polymers such as poly(n-vinylcarbazole) and polyethylene, have extremely large band gaps with energy as high as 5 eV required to excite electrons from the valence to the conduction band. Electrical applications of insulating organic polymers are limited to insulating or supporting materials where low weight and excellent processing and mechanical properties are desirable.

High electrical conductivity has been observed in several conjugated polymer or polyene systems. The first and simplest organic polymer to show high conductivity was "doped" polyacetylene. In the "doped" form its conductivity is in excess of 200 (ohm cm)$^{-1}$ with new preparations of doped polyacetylene now having conductivities in excess of $10^5$/S cm. Although polyacetylene was first prepared in the late 1950's, it was not until 1977 that this polyene was modified by combining the carbon chain with iodine and other molecular acceptors to produce a material with metallic conductivity.

Polyaniline is a family of polymers that has been under intensive study recently because the electronic and optical properties of the polymers can be modified through variations of either the number of protons, the number of electrons, or both. The polyaniline polymer can occur in several general forms including the so-called reduced form (leucoemeraldine base), possessing the general formula

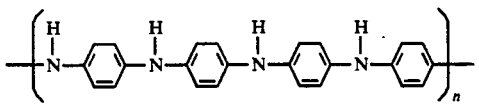

the partially oxidized so-called emeraldine base form, of the general formula

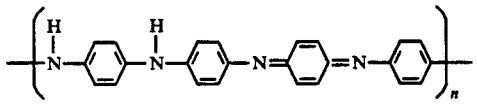

and the fully oxidized so-called pernigraniline form, of the general formula

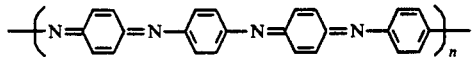

In practice, polyaniline generally exists as a mixture of the several forms with a general formula (I) of

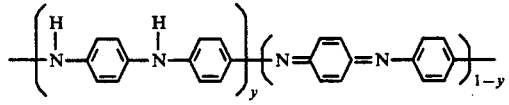

When $0 \leq y \leq 1$, the polyaniline polymers are referred to as poly(paraphenyleneamineimines) in which the oxidation state of the polymer continuously increases with decreasing value of y. The fully reduced poly(paraphenyleneamine) is referred to as leucoemeraldine, having the repeating units indicated above corresponding to a value of y=1. The fully oxidized poly(paraphenyleneimine) is referred to as pernigraniline, of repeat unit shown above corresponds to a value of y=0. The partly oxidized poly(paraphenyleneimine) with y in the range of greater than or equal to 0.35 and less than or equal to 0.65 is termed emeraldine, though the name emeraldine is often focused on y equal to or approximately 0.5 composition. Thus, the terms "leucoemeraldine", "emeraldine" and "pernigraniline" refer to different oxidation states of polyaniline. Each oxidation state can exist in the form of its base or in its protonated form (salt) by treatment of the base with an acid.

The use of the terms "protonated" and "partially protonated" herein includes, but is not limited to, the addition of hydrogen ions to the polymer by, for example, a protonic acid, such as mineral and/or organic acids. The use of the terms "protonated" and "partially protonated" herein also includes pseudoprotonation, wherein there is introduced into the polymer a cation such as, but not limited to, a metal ion, M$^+$. For example, "50%" protonation of emeraldine leads formally to a composition of the formula

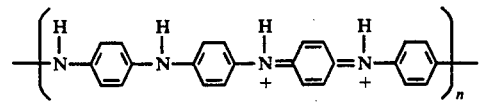

which may be rewritten as

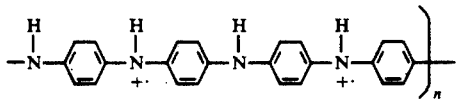

Formally, the degree of protonation may vary from a ratio of $[H^+]/[-N=]=0$ to a ratio of $[H^+]/[-N=]=1$. Protonation or partial protonation at the amine (—NH—) sites may also occur.

The electrical and optical properties of the polyaniline polymers vary with the different oxidation states and the different forms. For example, the leucoemeraldine base, emeraldine base and pernigraniline base forms of the polymer are electrically insulating while the emeraldine salt (protonated) form of the polymer is conductive. Protonation of emeraldine base by aqueous HCl (1M HCl) to produce the corresponding salt brings about an increase in electrical conductivity of approximately $10^{12}$; deprotonation occurs reversibly in aqueous base or upon exposure to vapor of, for example, ammonia. The emeraldine salt form can also be achieved by electrochemical oxidation of the leucoemeraldine base polymer or electrochemical reduction of the pernigraniline base polymer in the presence of an electrolyte of the appropriate pH. The rate of the electrochemical reversibility is very rapid; solid polyaniline can be switched between conducting, protonated and nonconducting states at a rate of approximately $10^5$ Hz for electrolytes in solution and even faster with solid electrolytes. (E. Paul, et al., *J. Phys. Chem.* 1985, 89, 1441–1447). The rate of electrochemical reversibility is also controlled by the thickness of the film, thin films exhibiting a faster rate than thick films. Polyaniline can then be switched from insulating to conducting form as a function of protonation level (controlled by ion insertion) and oxidation state (controlled by electrochemical potential). Thus, in contrast to, for example, the polypyrrole mentioned above, polyaniline can be turned "on" by either a negative or a positive shift of the electrochemical potential, because polyaniline films are essentially insulating at sufficiently negative (approximately 0.00 V vs. SCE) or positive (+0.7 V vs. SCE) electrochemical potentials. Polyaniline can also then be turned "off" by an opposite shift of the electrochemical potential.

The conductivity of polyaniline is known to span 12 orders of magnitude and to be sensitive to pH and other chemical parameters. It is well-known that the resistance of films of both the emeraldine base and 50% protonated emeraldine hydrochloride polymer decrease by a factor of approximately 3 to 4 when exposed to water vapor. The resistance increases only very slowly on removing the water vapor under dynamic vacuum. The polyaniline polymer exhibits conductivities of approximately 1 to 20 Siemens per centimeter (S/cm) when approximately half of its nitrogen atoms are protonated. Electrically conductive polyaniline salts, such as fully protonated emeraldine salt $[(-C_6H_4-NH-C_6H_4-NH^+)-Cl^-]_x$, have high conductivity ($10^{-4}$ to $10^{+2}$ S/cm) and high dielectric constants (20 to 200) and have a dielectric loss tangent of from below $10^{-3}$ to approximately $10^1$. Dielectric loss values are obtained in the prior art by, for example, carbon filled polymers, but these losses are not as large nor as readily controlled as those observed for polyaniline.

In addition, polyaniline has been used to coat semiconductor photoelectrodes, to serve as an electrochromatic display material, and to suppress corrosion of iron. Polymers have also recently been under investigation because of the ability to alter their optical properties as the result of exposure to optical excitation.

Polyaniline differs substantially from other polymers such as polyacetylene, polythiophene, polypyrrole and polydiacetylene in several important aspects. First, polyaniline is not charge conjugation symmetric; that is, the Fermi level and band gap are not formed in the center of the pi band, so that the valence and conduction bands are very asymmetric. [S. Stafstrom, J. L. Bredas, A. J. Epstein, H. S. Woo, D. B. Tanner, W. S. Huang, and A. G. MacDiarmid, Phys. Rev. Lett. 59, 1464 (1987)]. Consequently, the energy level positions of doping induced and photoinduced excitations differ from those in charge-conjugation-symmetric polymers such as polyacetylene and polythiophene. Second, both carbon rings and nitrogen atoms are within the conjugation path forming a generalized "A-B" polymer, unlike polypyrrole and polythiophene, whose heteroatoms do not contribute significantly to pi band formation. [M. J. Rice and E. J. Mele, Phys. Rev. Lett 49, 1455 (1982); J. L. Bredas, B. Themans, J. G. Fripiat, J. M. Andre and R. R. Chance, Phys. Rev. B29, 6761 (1984)]. Third, the emeraldine base form of polyaniline can be converted from an insulating to a metallic state if protons are added to the —N=state sites while the numbers of electrons on the chain is held constant. [J. C. Chiang and A. G. MacDiarmid, Synth. Met. 13, 193 (1986)]. For example, exposure of emeraldine base to a protonic acid such as HCl causes a transformation to the emeraldine salt form of polyaniline. The emeraldine salt form of polyaniline exhibits metallic properties which are due to the formation of a polaron lattice in the material. [J. M. Ginder, A. F. Richter, A. G. MacDiarmid, and A. J. Epstein, Solid State Commun., 63, 97 (1987); A. J. Epstein, J. M. Finder, F. Zuo, R. W. Bigelow, H. S. Woo, D. B. Tanner, A. F. Richter, W. S. Huang and A. G. MacDiarmid, Synth. Met. 18, 303 (1987); H. Y. Choi, and E. J. Mele, Phys. Rev. Lett. 59, 2188 (1987)].

The present invention is related to the invention disclosed in the co-pending application Ser. No. 305,872, which was U.S. Pat. No. 5,039,583 filed on Feb. 2, 1989 and is incorporated herein by reference. That application discusses an optical information storage process which provides for erasable high density optical data storage which can be used in information storage and processing applications. The powerful information storage process is based upon the photoexcited optical transformations resulting from the optical absorptions of polyaniline.

While the preparation of polyaniline polymers and the protonated derivatives thereof is known in the art, it is novel herein to prepare sulfonated polyaniline compositions which are capable of being "self-protonated" or "self-doped". The use of the terms "self-protonated" and "self-doped" herein includes, but is not limited to, the reorganization of hydrogen ions on the polymer i.e., the absence of any counterion not covalently bonded to the polymer chain. For example, self-doping or self-protonation of a polyaniline base polymer leads to a polyaniline salt polymer and a reorganization of the electronic structure which then forms a polaronic metal. The conductivity of such polaronic metal is independent of external protonation.

It is novel herein to use the self-doped sulfonated polyaniline compositions in a wide variety of electrochemical applications such as, for example, electrochromic displays, active electronic switches, in charge storage or battery technologies and in chemical sensors. It is also novel herein to use the self-doped, sulfonated polyaniline in a wide variety of applications for conducting electricity, such as, for example, as discharge layers for electron beam lithography and to form patterned images using electron beam lithography. It is also novel herein to blend self-doped, sulfonated polyaniline with other, insulating, polymers to form conductive thermosets, epoxies, and thermoplastics and for use in the blended or pure form for applications as a medium for electrical discharge.

It is also novel herein to use these self-doped polyaniline compositions for the attenuation of electromagnetic radiation. These self-doped polyaniline polymeric materials can be designed to absorb electromagnetic radiation. In addition, these polymeric materials are useful for developing a method of absorbing the electromagnetic radiation to modulate another electromagnetic beam. These polymeric materials are also useful for developing a method for the modification of the electromagnetic properties of the self-doped polyaniline compositions by chemical or electrochemical means. In addition, the distinct photoinduced properties of the self-doped polyaniline polymers provides a unique opportunity for the application of such polymers to such unique applications as erasable optical information storage technology.

SUMMARY OF THE INVENTION

The present invention provides a polymeric acid polymer which is capable of protonating or doping itself to form an electrically conducting polymer. The sulfonated polyaniline polymer has faster electronic, electrochemical, chemical, and optical responses and improved solubility than the parent polymer, polyaniline. The solubility of the sulfonated polyaniline polymer is increased greatly due to the presence of the sulfonic group $SO_3H$. The sulfonated polyaniline polymer is easy to dissolve in basic aqueous solutions in which the polyaniline polymer is insoluble. In addition, due to the electron withdrawing effects of the $SO_3H$ group, the sulfonated polyaniline polymer has improved environmental stability over the polyaniline polymer. The process for producing the sulfonated polyaniline comprises reacting the polyaniline polymer with concentrated sulfuric acid.

The present invention also relates to the use of sulfonated polyaniline compositions and their derivatives in electronic, electrochemical, chemical, and optical applications. In one aspect of the present invention, the speed of the electrochemical response of the sulfonated polyaniline compositions allows such compositions to be especially useful in such devices as for example, electrochromic displays, active electronic devices such as switches, chemical sensors, and in charge storage or battery applications.

In another aspect of the present invention, the ability of the sulfonated polyaniline compositions to conduct electricity makes such compositions especially useful as, for example, discharge layers for electron beam lithography and use in forming patterned images by electron beam lithography.

The present invention also relates to the use of sulfonated polyaniline as an electrical conductor, either in its pure form or blended with other polymers such as Kevlar or nylon to provide a medium for electrostatic discharge in device housings and also bulk coverings such as carpets and fabrics.

In addition, the invention relates to the use of sulfonated polyaniline or derivatives thereof for such applications as absorbing electromagnetic radiation. The invention further relates to the use of the radiation absorbing sulfonated polyaniline compositions to modulate another electromagnetic beam. The invention also relates to the modification of the electromagnetic response of sulfonated polyaniline compositions by chemical or electrochemical means. The invention further relates to electronic and microelectronic devices based on the chemical and physical properties of the sulfonated polyaniline and its derivatives, and the control of those properties in useful applications. The invention further relates to the use of the sulfonated polyaniline polymer as a high density erasable data storage medium intended for use in information storage and processing applications.

The present invention further relates to the use of sulfonated polyaniline and derivatives thereof for absorbing electromagnetic radiation, including microwaves, radar waves, infrared waves, visible waves, and ultraviolet waves as needed. The invention further relates to the use of the radiation-absorbing sulfonated polyaniline compositions to modulate another electromagnetic beam. The invention also relates to the modification of the electrical and optical properties of sulfonated polyaniline compositions by chemical or electrochemical means. The invention further relates to electronic and microelectronic devices based on the chemical and physical properties of sulfonated polyaniline and its derivatives.

While the invention relates to both microwave responses and nonlinear optical responses of sulfonic-acid substituted polyaniline and its derivatives, the inventors believe that these phenomena are of different physical origins. The photoresponse is believed to be the result of the reorganization of chemical bonds and to be microscopic. The time frame is believed to be approximately $10^{-13}$ to $10^{-12}$ seconds (a rate of $10^{+12}$ to $10^{13}$ Hz). The use of sulfonated polyaniline compositions to achieve the microwave attenuation of the present invention, however, is believed to be due to a local reorganization of the electronic density on the order of $10^1$ to $10^2$ Angstroms and on a time frame of approximately $10^{-10}$ seconds. Both the photoresponse and the microwave attenuation phenomenae are believed to be due to the absorption of electromagnetic radiation by the pi electron systems of the sulfonated polyaniline polymer and its derivatives.

The present invention also relates to a method the chemical or electrical erasure of the stored information in bit-wise manner by temporary conversion of a specified bit of a conducting form of a sulfonated polyaniline film. For instance, electrochemical conversion is achieved in a compact solid-state sandwich cell incorporating a solid electrolyte. This electrochemical conversion provides the ability to electrically erase or correct individual bits written optically within the polymer sample.

The present invention also relates to a method for the bit-wise or total erasure of the stored information. For example, application of an intense beam having a wavelength of approximately 1.2 microns such as that available from diode lasers and incandescent sources, to a storage medium composed of a sulfonated polyaniline emeraldine base film will enable the bit-wise erasure of a bit of information written into the medium using approximately 500 nm light. The total erasure of the stored information can be obtained by exposure of the entire storage medium to light of the appropriate wavelength.

Further, the present invention relates to a method for the "layering" of information stored. As the intensity of the photoinduced (write beam produced) change in absorption is proportional to the intensity of the write beam, discrimination of the amount of photoinduced optical absorption by the read beam enables more than one bit (0,1) to be written at a single bit location. For example, discrimination of two different levels of photoinduced optical absorption squares the total number of bits that may be stored: discrimination of three different photoinduced absorption levels cubes the number of bits that may be stored, etc.

The present invention and the sulfonated polyaniline materials described herein may also be used to provide a medium for recording of hologram as done for example in photorefractive $Bi_{12}SiO_{20}$ [J. P. Herriau and J. P. Huignard, Appl. Phys. Lett. 49, 1140 (1986)] and $BaTiO_3$ [J. Feinberg, Physics Today, 41 (10) 46 (1988)]. This technique allows for storage of information in a form of photoinduced fixed gratings within the sulfonated polyaniline material and formation of holographic images.

BRIEF DESCRIPTION OF THE DRAWINGS

FIG. 7 is a schematic illustration of the equilibrium between self-doped sulfonated polyaniline and its base form in aqueous $NH_4OH$ solution.

FIG. 8 is a schematic illustration of the redox process of the sulfonated polyaniline during sweeping the potential from −0.2~1.0 v vs Ag/AgCl.

DETAILED DESCRIPTION OF THE INVENTION

Figure 1:
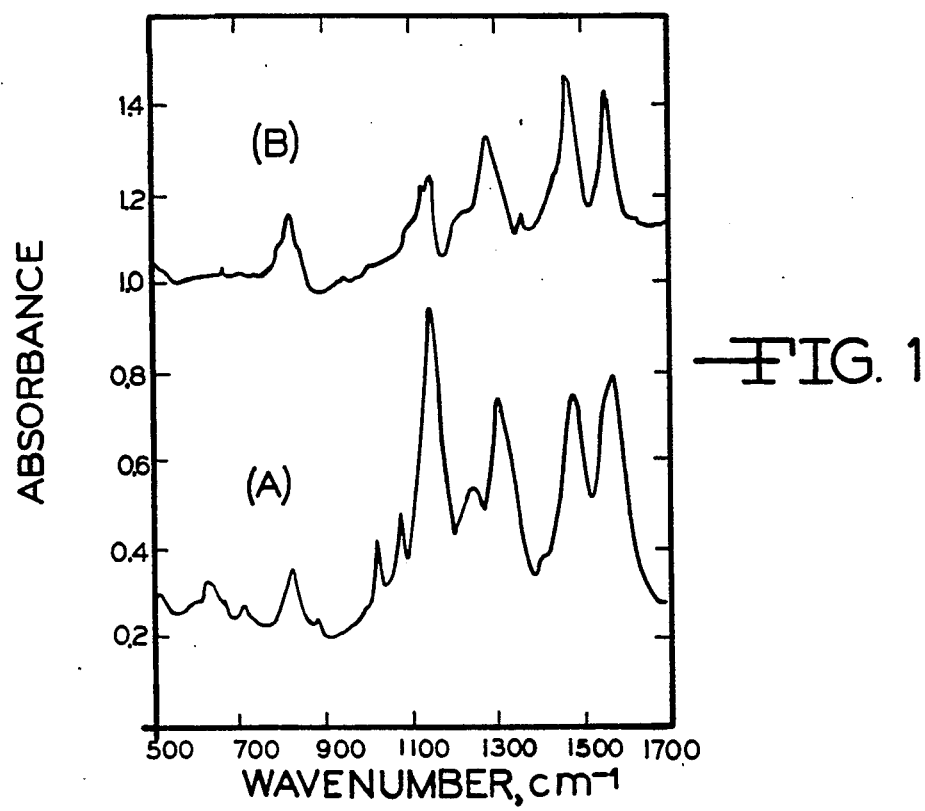
FIG. 1 is a graph illustrating the FTIR spectra of (a) self-doped sulfonated polyaniline; (b) emeraldine base, the parent polymer of sulfonated polyaniline in wave numbers $cm^{-1}$.

The present invention relates to sulfonic acid substituted polyaniline compositions, their derivatives, processes for their preparation and uses thereof. The self-protonated sulfonated polyaniline compositions have the formula I.

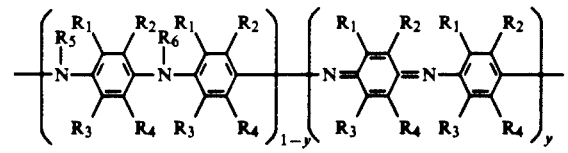

wherein $0 \leq y \leq 1$; $R_1$, $R_2$, $R_3$, $R_4$, $R_5$ and $R_6$ are independently selected from the group consisting of H, $-SO_3^-$, $-SO_3H$, $-R_7SO_3^-$, $-R_7SO_3H$, $-OCH_3$, $-CH_3$, $-C_2H_5$, $-F$, $-Cl$, $-Br$, $-I$, $-NR_{72}$, $-NHCOR_7$, $-OH$, $-O^-$, $-SR_7$, $-OR_7$, $-OCOR_7$, $-NO_2$, $-COOH$, $-COOR_7$, $-COR_7$, $-CHO$ and $-CN$, wherein $R_7$ is a $C_1-C_8$ alkyl, aryl or aralkyl group. For the sake of clarity, the structure shown in formula I is in the non self-protonated form.

The fraction of rings containing at least one $R_1$, $R_2$, $R_3$ or $R_4$ groups being an $-SO_3^-$, $-SO_3H$, $-R_7SO_3^-$ or $-R_7SO_3H$ can be varied from a few percent to one hundred percent. In certain embodiments the percentage ranges from at least approximately 20% up to and including 100%. It is within the contemplated scope of the present invention that the $-R_7SO_3^-$ and $-R_7SO_3H$ substituents can be varied so that the sulfonated polyaniline is soluble in a range of solvents in order to make the sulfonated polyaniline polymer more easily blendable with other polymers and/or more easily cast onto a variety of surfaces.

The solubility of sulfonated polyaniline can be varied by changing the degree of sulfonation (i.e., the sulfonation time and/or temperature in $H_2SO_4(SO_3)$). It is noted that the oxidation state of the polymer (from leucoemeraldine through emeraldine to pernigraniline) and the degree of sulfonation (x) can be independently varied. Here x is the fraction of $C_6$ rings which have an $SO_3^-$ or $SO_3H$ group attached.

When $x=0$, the polymer does not dissolve in either basic or acidic aqueous solutions. Upon increasing the value of x, the polymer becomes soluble in strongly basic, basic, weakly basic and eventually in acidic aqueous solutions. This progressive improvement in solubility implies that the polymer becomes soluble in neutral media, particularly $H_2O$, at the appropriate value of x, yielding a water-soluble conducting polymer. The color of soluble sulfonated polyaniline in acidic solution is green, indicating it is the conducting salt form.

The solubility of polyaniline is increased greatly in basic aqueous solution by the presence of $-SO_3H$ group on the phenyl rings. This is in contrast with polyaniline which when washed with basic solutions, converts to the insoluble base form.

Protonation of the emeraldine base polymer leads to the emeraldine salt polymer and a reorganization of the electronic structure to form a polaronic metal. Since benzenesulfonic acid is a strong acid, about as strong as hydrochloric acid, the sulfonated polyaniline is capable of self-doping. Hence, the conductivity of the sulfonated polyaniline is independent of external protonation.

Being able to dope itself, the sulfonated polyaniline polymer has enhanced optical and electrical response to electrochemical potential as compared with the parent polyaniline polymer. Since the solid-state diffusion of counterions in and out of a polymer during electrochemical processes is often the rate controlling step in the kinetics, it also limits the speed of both optical and electrical response of polymers. In the self-doped conjugated polymer of the present invention, the counterions are not necessary from the medium. The positive charge introduced into the conjugated pi electron system of the backbone of the polymer is compensated by the protons migrating out of the polymer, or vice versa, leaving behind the opposite charged counterion. Being the smallest and most mobile ion, proton hopping mechanisms lead to relatively fast doping kinetics as compared to those counterions migrating in or out of the polymer. As a consequence, it is possible to achieve sufficient speed to be useful for a variety of technological applications.

The sulfonated polyaniline polymers of the present invention provide opportunities to use the phenomena of the dependence of electrical and optical properties on the backbone chain conformation and on the substituent as well as chain properties which change the chemical properties of polyaniline in a number of useful applications. The side groups on polyaniline also can affect the charge transport in polyaniline. Theoretical studies of polyaniline indicate that the bandgap and bandwidth are affected by the torsion angle (dihedral angle) between adjacent rings on the polymer chain. The torsion angle influences the electronic properties of many conducting polymers with aromatic backbones. For example, poly(o-toluidine) has been studied and the results show that the reduction in pi conjugation of the alkyl derivatives of polyaniline is caused primarily by steric effect.

The present invention discloses herein the synthesis, the electronic, electrochemical and optical properties of sulfonated polyaniline. It is disclosed herein that without external doping, the sulfonated polyaniline has a conductivity of 0.5 S/cm, which makes the sulfonated polyaniline a self-doped conducting polymer. The results indicate that the amount of charge injected into or ejected out of the sulfonated polyaniline polymer is quite similar to that of polyaniline. Charge transfer doping within a specific potential range in solutions such as 1.0M HCl and 0.5M $H_2SO_4$ is highly reversible in the air reflecting the environmental stability introduced by the sulfonic acid groups. The inventors present the dependence of positions of redox peaks on different pH values and compare the results with those of sulfonated polyaniline. In contrast with polyaniline, the first redox process depends on pH in the value range of $-0.2 \sim 7$ due to the sulfonic acid protons on the sulfonated polyaniline backbones. The second redox process depends on the pH in a manner similar to that of polyaniline.

The chemical synthesis of the sulfonated polyaniline polymers of the present invention is accomplished by reacting polyaniline with concentrated or fuming sulfuric acid. Various methods for such synthesis are disclosed below.

Materials —Aniline and other chemicals were obtained from Aldrich and were all reagent grade or better. Hydrochloric acid and ammonium hydroxide were used as received. Different pH buffer solutions were commercially purchased.

Chemical Synthesis I: Emeraldine hydrochloride powder was synthesized from aniline and $(NH_4)S_2O_8$ then converted to analytically pure emeraldine base polyaniline using the method described previously in A. G. MacDiarmid, J. C. Chiang, A. F. Richter, N. L. D. Somasiri and A. J. Epstein in L. Alcacer (ed.) *Conducting Polymers*, D. Reidel Publishing Co., Dordrecht, The Netherlands (1987).

For the sulfonation of polyaniline, 1.5 g polyaniline (dry emeraldine base form) was dissolved into 40 ml fuming sulfuric acid $H_2SO_4(SO_3)$ with constant stirring at room temperature. During the sulfonation period the color of the solution changed from dark purple to dark blue. After approximately 2 hours, the solution was slowly added during about 20 minutes to 200 ml methanol while maintaining the temperature between about 10°-20° C. by an ice bath. A green powder precipitate was formed during the mixing. After the mixing, 100 ml less polar acetone was added to the solution in order to increase the precipitate. The green powder was then collected on a Buchner funnel using a water aspirator. The precipitate cake was washed portionwise (50 ml/portion) with methanol until the portion of the filtrate showed pH=7 when tested by wet pH paper. The liquid level in the Buchner funnel was constantly adjusted so that it remained above the top of the precipitate. This prevented cracking of the precipitate cake, which would result in inefficient washing of the precipitate cake.

Figure 6:
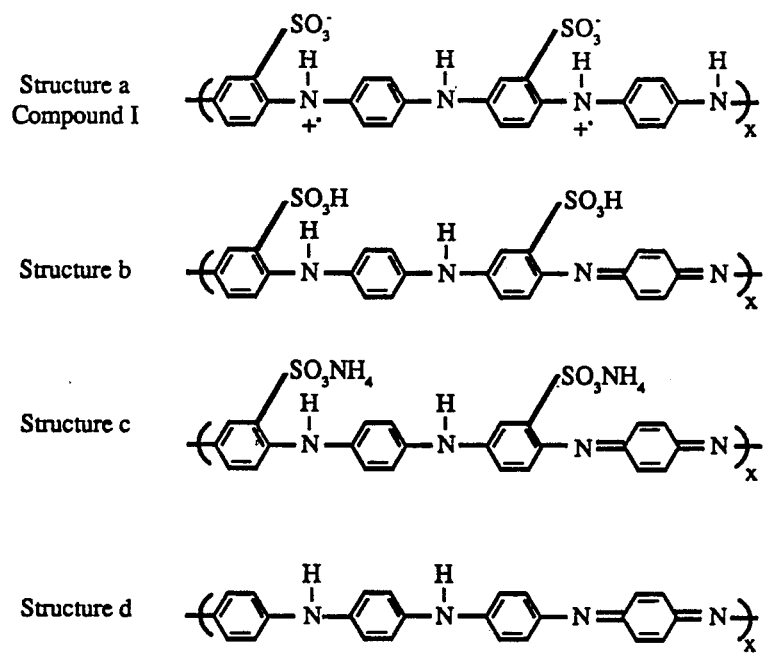
FIG. 6 is a schematic illustration of the equilibria among different structures of self-doped sulfonated polyaniline.

After the above washing, the precipitate remained under suction for approximately 10 minutes. It was then transferred on the filter paper to a vacuum desicator and dried under dynamic vacuum for 24 hours. Elemental analyses, as shown in Table I are consistent with the composition shown in FIG. 6 as structure a, compound I, which is sulfonated, protonated polyaniline in the emeraldine oxidative state. The self-doped polyaniline is readily dissolved in a dilute aqueous base solution to form a homogeneous blue-violet solution. The solubility of compound I in 0.1M $NH_4OH$ and NaOH is ~23 mg/ml.

Chemical Synthesis II: 1.5 g polyaniline (dry emeraldine base form) was dissolved into 40 ml concentrated sulfuric acid $H_2SO_4$, and the temperature slowly raised from the room temperature to 70° C. in water bath in 3 hour period with the constant stirring. The temperature was kept at 70° C. for 15 hours. Then the temperature was raised to 95° C. within 0.5 hour and kept there for 4 hours. The reaction mixture was cooled down to room temperature. The product was very slowly added to −38° C. ice made from 160 ml distilled $H_2O$ in order to precipitate the polymer. The temperature of the solution was not allowed to reach higher than 0° C. during the process. After the temperature of the solution reached room temperature the solution was filtered to obtain a fine powder of sulfonated polyaniline. Large particles were obtained by subsequently heating the room temperature solution up to 70° C. in a two hour period, then cooling to room temperature, and conducting filtration to separate the sulfonated polyaniline from the solution. The sulfonated polyaniline was washed with an excess of $H_2O$ until the filtrate was neutral (as tested by pH paper). Dry sulfonated polyaniline was obtained by pumping under dynamic vacuum at room temperature for 48 hours.

Chemical Synthesis III: From the Chemical Synthesis II described above a copolymer (i.e., the polymer mixture of polyanilines and sulfonated polyaniline) was obtained by partially sulfonating polyaniline. This was done is exactly the same way described in the Chemical Synthesis II except utilizing shorter sulfonation times and/or lower sulfonation temperature.

Chemical Synthesis IV: Another way to prepare the copolymer polyaniline-sulfonated polyaniline was to react 2-aminobenzene-sulfonic acid (2ASA) with oxidizing agent in the presence of aniline. 10 g (0.58 mol) 2ASA and 2 ml (0.02 mol) aniline were dissolved in 500 ml 1M HCl. A prepared solution of 6.609 g (0.029 mol) $(NH_4)_2S_2O_8$ in 200 ml 1M HCl was added dropwise to the monomer solution with vigorous stirring during a period of 10 minutes. After 1.5 hours, the precipitate was collected on a Buchner funnel. The precipitate was washed with 1M HCl until the filtrate was colorless. Then the precipitate was washed by 500 ml $H_2O$. To ensure that the copolymer was in its neutral form, the precipitate was then transferred into a beaker containing 500 ml of $H_2O$ and stirred at room temperature for 4 hours. The mixture was filtered until the pH of the filtrate was 7. The dry copolymer was obtained by pumping under dynamic vacuum at room temperature for 48 hours.

Infrared and electronic spectra. Infrared spectra were obtained by mixing the compound I into KBr matrix, pressing into pellets and recording on an FTIR spectrometer.

For taking electronic spectra the compound I was dissolved in 0.1M $NH_4OH$ to form a homogeneous solution, the polymer solution was then cast on a quartz substrate. Slow evaporation of the aqueous solution of the compound II (ammonium salt) in air at room temperature resulted in spontaneous removal of the weak volatile base, $NH_3$ with reformation of the compound I.

Electron spin resonance. Temperature dependent (30K to 295K) electron spin resonance was measured for the compound I using a Bruker 300 spectrometer and an Oxford 900 temperature control system.

Conductivity measurement. Conductivities of the compound I was measured on compressed pellets of the powder by using four point probe techniques with a Keithley 220 constant current source and Keithley 181 voltmeter.

Cyclic voltammetry studies. Cyclic voltammetry studies were carried out using a Hokto Corporation (HC) Model HA-301 potentiostat/galvanostat with HC HC-201 digital coulometer. The HC HB-111 universal programmer was used for the generation of the sweep signals which were fed into the HA-301. Voltammograms were recorded on a Hewlett-Packard Model 7046B XYY′ recorder with an optional time base function. For the studies of current peak changing with the sweep rate, a Nicolet Model 370 digital oscilloscope with digitizer and disk-drive plug-in was used for recording $i_p$ in the high frequency characterization experiments. A standard three electrode system was enclosed in a dual compartment cell with a fine porosity glass frit separating the working electrode and reference electrode from the counter electrode. Platinum disks (1.0 $cm^2$) were used as working and counter electrodes. A Ag/AgCl, saturated KCl electrode encased with a luggin probe was used as a reference electrode. 1.0M HCl(20 ml) was used as the electrolyte. All studies, except scan rate dependence of current peak, were performed at a sweep rate of 50 mV/s. Since preliminary observations indicated that air did not have any effect on the cyclic voltammograms, all operations were carried out in the presence of air.

The compound I was cast on a Pt electrode by evaporating a solution of the polymer in 0.1M ammonium hydroxide and subsequently dried in air. In order to obtain reproducible cyclic voltammograms the electrode was preconditioned by cycling between −0.2 and 0.4 volts vs Ag/AgCl for ~10 minutes (25 cycles).

Structure Characterization and Physical Properties. Elemental analyses, infrared and electronic spectroscopy, conductivity and cyclic voltammetry studies are consistent with the sulfonation of emeraldine base with fuming sulfuric acid proceeding to give a self-doped, sulfonated, protonated forms of the emeraldine oxidative state of polyaniline, the compound I which has a conductivity of ~0.5 S/cm. This polymer can be regarded as being formed by the hypothetically initial formation of the strong acid, shown as structure b in FIG. 6, which then immediately protonates the imine nitrogen atoms to give the conducting polymer in an entirely analogous manner to strong acids such as HCl. Treatment of the structure b compound with an aqueous (ammonium) base yields the sulfonated, non-protonated insulating ammonium salt forms analogous to emeraldine base, viz, the structure c compound shown in FIG. 6.

With respect to the above structure, sulfonation occurs preferentially in alternating rings and that under the present experimental conditions, only half the rings were sulfonated. This is consistent with the increased stability of the semiquinone form. Further sulfonation and consequently double protonation of nitrogen atoms convert some of the —(NH)—to—$(NH_2^+)$— and hence reduce the conjugation of the polymer. The FTIR spectrum shown in FIG. 1 of the self-doped polyaniline, the compound I, is consistent with the presence of —$SO_3$— groups alternated to the aromatic rings. IR shows absorption maxima of out of plane bending of aromatic hydrogens at 820 and 870cm$^{-1}$ are indicative of 1, 2, 4 trisubstitutents on the rings. The absorptions are not present in the 1, 2 disubstituted emeraldine base from which the compound I was synthesized. Absorption peaks at 1080, 700 and 590 cm$^{-1}$ are consistent with the presence of $SO_3^-$ groups.

The conductivity of the compound I ($\sigma \sim 0.5$ S/cm) is similar to that of emeraldine hydrochloride measured under the same experimental conditions ($\sigma \sim 1-5$ S/cm; laboratory air), but lower than that $\sigma \sim 18$ S/cm of high molecular weight emeraldine hydrochloride. The self-doped sulfonated polyaniline with emeraldine oxidative state differs dramatically from nonexternally doped polyaniline in conductivity. Since sulfonic acid is a strong acid, approximately as strong as hydrochloric acid, the compound I is capable of doping itself. Pressed pellets of the dark green self-doped compound I had a room temperature conductivity of $\sim 0.5$ S/cm in contrast to the purple color and insulating behavior of polyaniline emeraldine base form. However, the conductivity of compound I is lower than that of emeraldine hydrochloride pressed pellets; analogy with earlier study of poly(o-toluidine), the lower conductivity is in accord with increased conduction electron localization induced by the side chain effects of $-SO_3^-$.

The solubility of the compound I also differs markedly from that of the corresponding polyaniline polymer. The compound I dissolves completely in aqueous 0.1M $NH_4OH$ or NaOH to give a blue-violet solution while polyaniline washed with such solvent converts to the insoluble base form. The compound I partially dissolves in NMP to form a blue color solution and as well as DMSO (dimethyl sulfoxide) to show green color. Treatment of the self-doped polyaniline, compound I, with an aqueous base proceeds consequently to the deprotonation of the backbone of the polymer to form the structure corresponding to emeraldine base, as shown in the reaction A or reaction B depicted in FIG. 7.

The deprotonation results in a 9 or 10 order of magnitude decrease in conductivity. Compound I differs from emeraldine hydrochloride in that it is soluble in aqueous 0.1M $NH_4OH$ and NaOH.

Based on solid state $^{13}$C NMR studies, [T. Hjertberg, W. R. Salaneck, I. Landstrom, N. L. D. Somasiri and A. G. MacDiarmid, *J. Blymer Sci; Polym. Lett. Ed.*, 23 (1985) 503] it has been reported that adjacent phenyl rings of the emeraldine backbone are noncoplanar. Introduction of sulfonic acid groups on phenyl rings of the polyaniline backbone can be expected to increase the torsional angle between adjacent rings to relieve steric strain.

Figure 2:
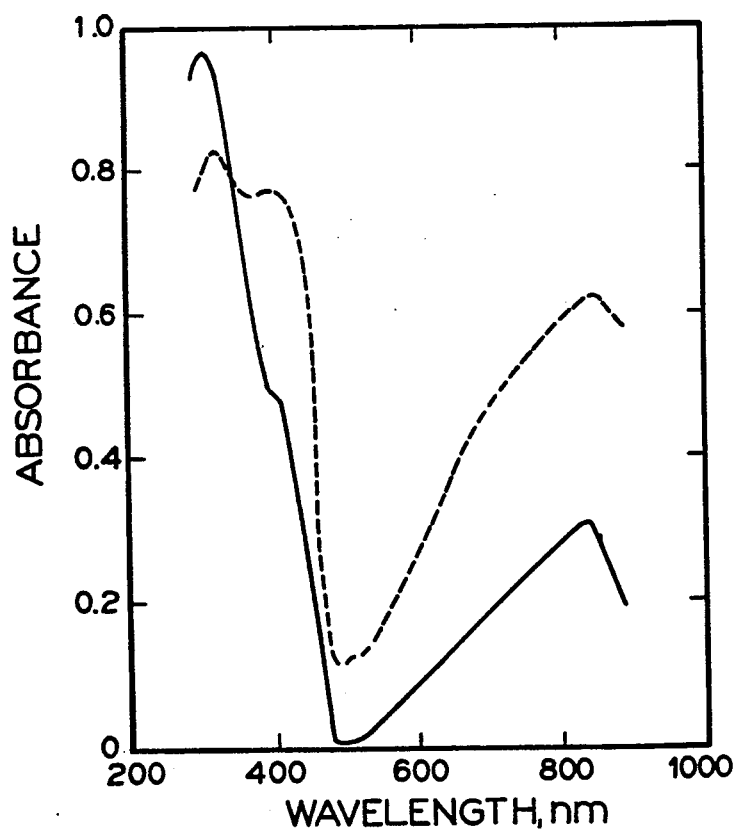
FIG. 2 is a graph illustrating the electronic absorption spectra of (a) —sulfonated polyaniline film cast from an aqueous $NH_4OH$ solution in a quartz substrate, then dried in air, (peaks at 3.88 and 2.16 eV in 0.1M $NH_4OH$; (b)—emeraldine salt film, (peaks at 3.76 and 2.0 eV) in NMP.

Comparisons of the electronic absorption spectra of the compound I and emeraldine base provide insight into changes in the molecular geometry caused by the sulfonic group-substitution on the polyaniline backbone. Steric effects are considered in the interpretation of the electronic absorption spectra of the sulfonated polyaniline. In order to compare the feature of the electronic spectra of the self-doped polymer (compound I) and emeraldine hydrochloride, their spectra are given in FIG. 2. The high energy absorption band at 320 nm (3.88 eV) and 326 nm (3.81 eV) for compound I and emeraldine hydrochloride, respectively, is assigned to the pi-pi* transition based on earlier experimental and theoretical studies. The other two absorption bands at 435 nm (2.38 eV) and 850 nm (1.46 eV) for the compound I, 413 nm (300 eV) and 826 nm (1.50 eV) for emeraldine hydrochloride, have been assigned to the optical absorption of the metallic polaron band of the salt form. The hypsochromic shift of the pi-pi* transition in going from emeraldine hydrochloride to compound I is again in accord with decreased extent of conjugation caused by increased phenyl ring torsion angle which results from steric repulsion between the $-SO_3^-$ groups and hydrogens on the adjacent phenyl rings. The bathochromic shift of the polaron band transition is also in agreement with relative energy band shifts expected for increased ring torsion angles.

Temperature dependent electron spin resonance studies show a $\sim 0.4$ G peak to peak linewidth for compound I at room temperature similar in intensity to that of emeraldine salt. This result support that compound I is in the polysemiquinone (polaron energy band) state.

Figure 3:
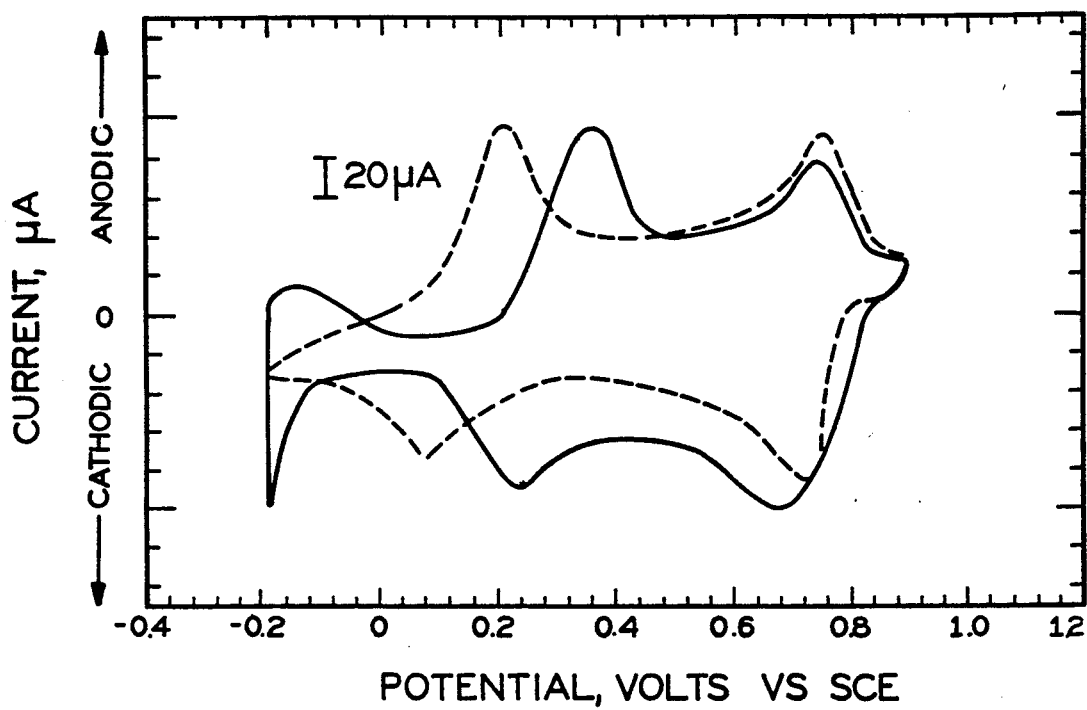
FIG. 3 is a graph illustrating the cyclic voltammograms (50 mV/s) of (a) —sulfonated polyaniline in 1M HCl, (b)—polyaniline in 1M HCl.

Redox Properties: The color of a sulfonated polyaniline film on Pt electrode in 1M HCl electrolyte was changed by varying the applied potential. These color changes were similar to those of polyaniline under the same conditions. When the potential was scanned between $-0.2$ to 0.5 V vs Ag/AgCl a pair of redox peaks were found for sulfonated polyaniline electrode as seen in FIG. 3. The polymer was initially transparent yellow at $-0.2$ V (reduced state) and changed to a green color at 0.5 V. The earlier studies of polyaniline showed that repeated potential cycling between $-0.2$ and 0.5 V vs SCE in 1M $ZnCl+0.5M$ $(NH_4)Cl$ could be performed without causing degradation of the polymer. In a potential scan range between $-0.2$ and 0.6 V vs SCE in 1M HCl polyaniline film is fairly stable and the shape of the voltammograms changed little during $5 \times 10^3$ cycles. A similar stability was observed for sulfonated polyaniline, the voltammograms of film in 1M HCl remained almost the same after 48 hr. scan in the range of $-0.2$ and 0.6 V with the scan rate 50 mV/s (approximately 5,000 cycles). The typical cyclic voltammograms of sulfonated polyaniline polymer films in 1M HCl exhibited a sharp anodic peak at 0.35 V with $\Delta E_{p/2}$ approximately 0.10 V and a broad cathodic peak at 0.24 V with $\Delta E_{p/2} \sim 0.14$ V.

The higher oxidative potential of the first anodic peak of sulfonated polyaniline as compared with that of polyaniline is expected due to the steric and electronic effects of $-SO_3H$ function group in 1M HCl. Steric effect of short range forces from ortho substituting $-SO_3H$ changes the basicity of the amino group. These forces may be steric compression exerted in different degrees in the emeraldine forms of the polymer backbone and a pressure-produced twisting of the amine or imine groups with a consequent (partial) breakdown of the conjugation, and therefore a modification of the mesomeric effect on basic strength of amine or imine groups.

Introduction of a $-SO_3H$ group on phenyl rings and consequent increase in the torsion angle will decrease the degree of orbital overlap between the phenyl pi-electrons and the nitrogen lone pairs. This decreases the extent of pi-conjugation and raises the energy of the half-oxidized semiquinone cation radicals. This lower thermodynamic stability of the half-oxidized semiquinone results in difficulty for fully reduced polymer to be oxidized at the first anodic process. As a consequence, this increases the oxidation potential of the polyamine form of the sulfonated polyaniline. In addition, Flurschein first pointed out that all ortho-substituents reduce the basic strength of the primary aniline bases. This also can be expected for the sulfonated polyaniline reduced leucoemeraldine form. At the first anodic peak, the leucoemeraldine base form of sulfonated polyaniline is transformed to the ionic self-doped emeraldine salt form. The acidic center of the emeraldine salt form of sulfonated polyaniline, being strongly solvated, would likely have a larger effective volume than the groups in the neutral base. As a consequence of this there is an increased steric compression that should increase the relative thermodynamic stability of the base. That is, it should make the base weaker, or its conjugate acid stronger. In other words, higher oxidative potential than polyaniline. Because of poor conjugation of —SO$_3$H with nitrogen lone pair electrons during the first oxidizing process, the steric effect is a dominant factor.

The situation is different at the second anodic process which had an anodic peak at 0.76 V in 1M HCl. During this oxidation process the half-oxidized semiquinone cation radicals are further oxidized into the (non-protonated) quinonediimine (pernigraniline form) which may be facilitated by the formation of two, sp$^2$-hybridized nitrogen. Some of the steric strain may be relieved by the wider C—N=C bond angles at the quinoid groups than the benzenoid ones. However, the better conjugation of lone pairs at nitrogen atoms with pi-electrons on phenyl rings as well as the electron withdrawing property of —SO$_3$H lowers the electron density on the nitrogen atoms. These effects raise the energy of forming fully-oxidized semiquinone dication radicals. The oxidative potential for the second redox process is similar to that of the parent polyaniline. In the second anodic process, the electron-withdrawing property of —SO$_3$H is more important than the steric effect since the poly(o-toluidine) has similar steric repulsions yet lower oxidative potential due to the electron-donating property of methyl group.

When sulfonated polyaniline film was scanned between a potential −0.2 to 0.9 V in 1M HCl, as seen in FIG. 3, two distinct pairs of redox peaks are found. The second anodic peak is at 0.75 V for sulfonated polyaniline, which is similar to that of parent polyaniline (0.75 V vs Ag/AgCl). The implication is that the leucoemeraldine form of sulfonated polyaniline is more oxidatively stable than its parent polyaniline. The cyclic voltammogram behavior of sulfonated polyaniline in 1M HCl electrolyte showed good stability in air. However, once the potential was higher than 0.8 V a third anodic peak appeared between two previous peaks. This is due to the degradation of the sulfonated polyaniline polymer. In the high potential region the polymer degraded in the aqueous solution of HCl forming p-benzoquinone or hydroquinone by hydrolysis of overoxidized polymers. The rate of degradation was strongly dependent on the applied potentials.

Figure 4:
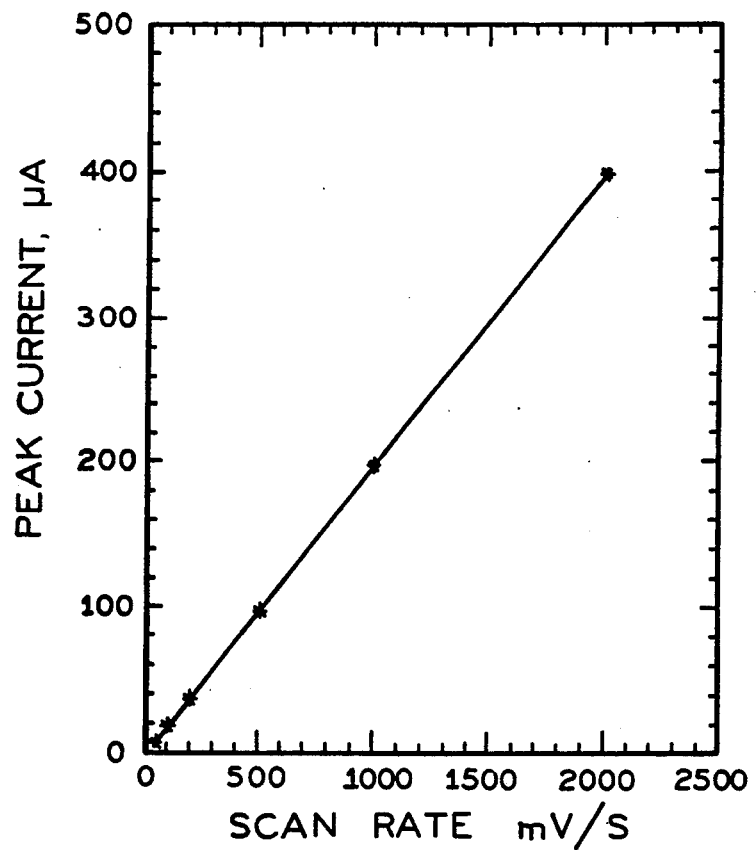
FIG. 4 is a graph illustrating the anodic peak current vs sweep rate of cyclic voltammograms in aqueous 1.0M HCl electrolyte at 298K.

The scan rate dependence of the current peak of polymer film indicates that the electron transfer through the film is fast. The first anodic peak current shown in FIG. 3 exhibits a linear relationship with a scan rate v. The relationship is linear between $i_p$ and v at least up to a scan rate of 2000 mV/s, as seen in FIG. 4, as expected for the reaction of surface localized materials. These redox reactions are faster than polyaniline due to the sulfonic group on phenyl rings. For polyaniline there are no counterions in the backbone of neutral polymer. During electrochemically cycling between two different oxidation states (i.e., doping and dedoping), the counterions must migrate into the polymer during doping process and diffuse out of polymer in dedoping process in order to compensate the charge. This solid-state diffusion process is often the rate limiting step in the kinetics. However, because of —SO$_3$H group in the backbones of the sulfonated polyaniline polymer, when positive charge is introduced into the pi-electron system (doping or oxidizing), the system can be compensated by proton migrating out of the polymer from the —SO$_3$H group leaving the negative charged counterions behind the backbones of the polymer. This is illustrated in the scheme as shown in FIG. 8, (1), (2).

From (1) to (2) H$^+$ migrated out of polymer instead of Cl$^-$ diffused into the polymer. Since the proton is the smallest ion with the highest mobility, the sulfonated polyaniline is expected to have a faster kinetic process than that of polyaniline.

Dependence of Peak Positions on pH: For the reversible redox reaction,

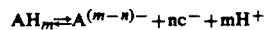

The corresponding Nernst equation is:

$$E_{red} = E^0_{red} + \frac{RT}{nF} \ln \frac{[A^{(m-n)-}][H^+]^m}{[AH_m]}$$

$$= E^0_{red} + \frac{0.059}{n} \log \frac{[A^{(m-n)-}]}{[AH_m]} + 0.059 \frac{m}{n} \log[H^+]$$

$$= E_{\frac{1}{2}} + 0.059 \frac{m}{n} \log[H^+]$$

at 25° C.

It clearly shows that in a reaction in which the proton is involved the reduction potential is dependent on pH. If the pH is changed in a system with a given fixed ratio of A$^{(m-n)-}$ and AH$_m$, then a plot of E$_{\frac{1}{2}}$ vs pH will give a straight line with the slope −0.059 m/n V, or −59 m/n mV per pH unit. If the numbers of protons and electrons involved in this redox reaction are equal, say AH=A+H$^+$+e$^-$, the slope of the line will be −59 mV per pH unit. However, if the process is as AH$_2$$^+$=A+2H$^+$+e, where the number of protons liberated is twice the number of electrons involved, an analogous plot would have a slope of 59×2/1=118 (mV) per pH unit.

Figure 5:
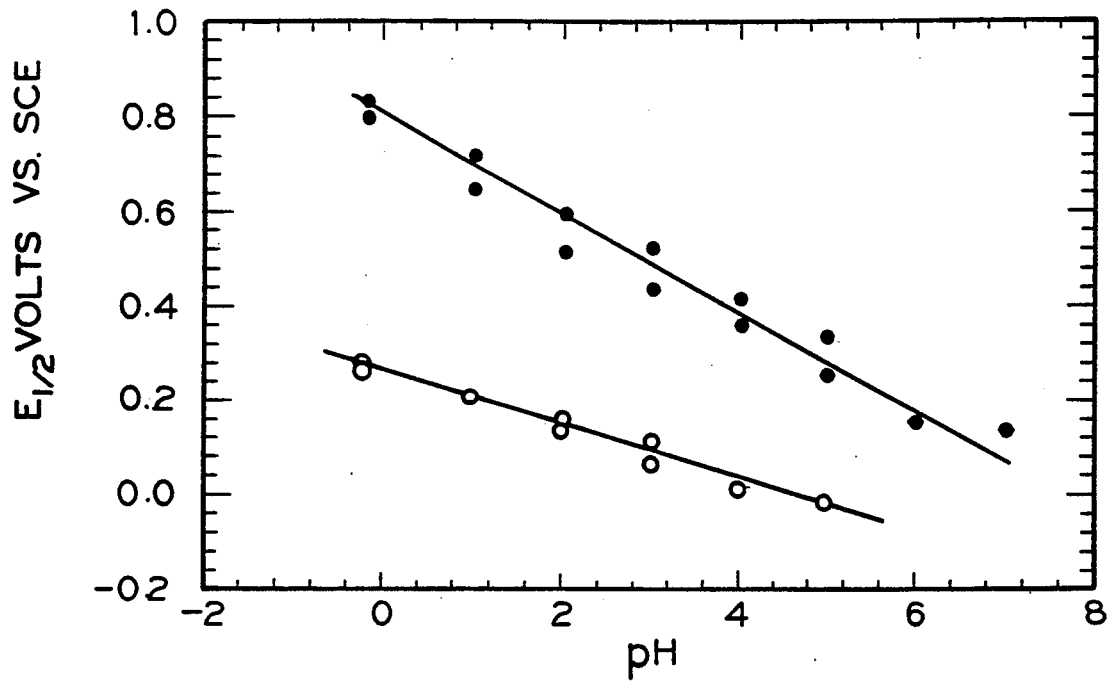
FIG. 5 is a graph illustrating the relationship between $E_j$(50 mV/s) and pH (a)○ the first, (2)● the second redox process of sulfonated polyaniline in the pH range −0.2 to 7.

FIG. 5 shows the potential dependence of the first and second redox processes of sulfonated polyaniline on pH (pH range from −0.2 cal to 5). In contrast with polyaniline, in which the first redox process is independent on the pH in such range (though it is dependent on pH at lower pH levels), the potential of the first redox process of sulfonated polyaniline was linearly changed with the pH values with the slope of −59 mV/pH due to the active protons in —SO$_3$H function group. This is consistent with the redox scheme shown in FIG. 8, (1), (2).

At the second redox process, however, the position of the E$_{\frac{1}{2}}$ changed linearly with pH with the slope of 120 mV/pH, twice as large as the first one with respect to the pH values. This suggests the redox process as (3)∼(5) shown in FIG. 8 with an electronic state at 0.76 V similar to that of the pernigraniline form for polyaniline.

Compared with polyaniline, the second redox process of sulfonated polyaniline has a similar pH dependence as polyaniline due to the same backbone structure, however, its first redox process behaves differently from polyaniline in pH range −0.2 to 7 because of active protons on the polyaniline backbone.

The present invention thus discloses that sulfonated polyaniline can be synthesized chemically. Elemental analyses and FTIR data suggest that, depending on the sulfonation times and temperatures, the number of —$SO_3H$ groups per phenyl ring varied from 0.2 to 1.0. The conductivity is independent of pH in the range of pH values smaller than or equal to 7. The cyclic voltammograms of sulfonated polyaniline consist of two pairs of well resolved redox peaks corresponding to the conversion of amine nitrogen to semiquinone (polaron) and of the polaron to bipolaron (or imine nitrogen), respectively. Two effects, steric and electronic, are associated with the sulfonic substituent. The steric effect is largely responsible for: (1) the decrease in the conductivity; (2) the hypsochromic shifts of the pi-pi* transition band in UV-region; and (3) the increase in the thermodynamic stability of the amine nitrogen base as compared with the parent polyaniline. The electronic effect is mainly responsible for: (1) independence of the conductivity on the pH; (2) dependence of the first redox process on pH; and (3) the decrease in the basicity of the imine species of the sulfonated polyaniline.

The present invention further relates to the uses of the sulfonated polyaniline compositions and their derivatives in electronic, electrochemical, chemical, and optical applications. The sulfonated polyaniline compositions have a more rapid electrochemical response than polyaniline. The ability of the sulfonated polyaniline compositions to have a fast switching speed between a conducting and a nonconducting state with good reversibility makes such compositions attractive polymers to use for a variety of electrochemical applications.

Applications contemplated by the present invention include but are not limited to the use of sulfonated polyaniline compositions for elecrochromic displays where the composition's active response to a voltage step allows for a rapid change in color. Another application involves the use of sulfonated polyaniline compositions in active electronic devices such as switches and transistors. Yet other applications involve the use of sulfonated polyaniline compositions for charge storage or rechargeable battery applications since the sulfonated polyaniline compositions have excellent chemical stability along with good reversibility properties. The sulfonated polyaniline compositions are also useful as chemical sensors, wherein exposure to bases, acids, water and the like reactive chemicals causes a change in color of the composition and a change in the conductivity of the composition.

The solubility and the electrical conductivity of the sulfonated polyaniline compositions makes such compositions especially useful in still other applications. For example, other applications contemplated by the present invention are the uses of sulfonated polyaniline compositions as discharge layers for an electron beam lithography process and in use in forming patterns by such process. Still other applications include the use of sulfonated polyaniline compositions as electrical conductors, either in pure form or blended with other polymers such as Kevlar ® and Nylon ®, for use as a medium for electrostatic discharge in, for example device housings, and bulk coverings such as carpets and fabrics.

The sulfonated polyaniline compositions can be coated by a variety of techniques onto substrates of choice. The sulfonated polyaniline polymers can be applied to substrates according to the present invention by spray coating, dip coating, spin casting, transfer roll coating, brush-on coating, and the like. The sulfonated polyaniline polymers can also be electrochemically deposited onto conductive substrates by known electrochemical deposition techniques.

Sulfonated polyaniline can also be entrained within a matrix of, or copolymerized with, other polymer materials to thereby produce a blend or a composite. Thus, sulfonated polyaniline could be dispersed in, for example, polyethylene, polyimide, cellulose nitrate, and the like, and also can be coated onto fibrous materials. The sulfonated polyaniline compositions can be used with other insulating polymers to form conductive thermosetting resins, epoxies, and thermoplastics, and reacted with bismaleimides for use in forming, for example, such devices as conductive seals, joints and moldings. In addition, derivatization of the sulfonated polyaniline compositions can enhance compatibility and processability of the polymer with other polymers.

In addition, the sulfonated polyaniline compositions can be cast as thin films from a solvent solution, and the solvent evaporated to produce free standing films. The sulfonated polyaniline films can be stacked as a composite with other sulfonated polyaniline films, with films of sulfonated polyaniline copolymerized with another polymer, or with non-polyaniline polymers and/or copolymers. Depending on the desired type and degree of substitution of the sulfonated polyaniline with various crosslinkable functional moieties, the films produced can be cured in deeper sections, that is, thicker films or articles can also be produced by known polymer preparation techniques.

The sulfonated polyaniline compositions and derivatives thereof have, or can be designed to have, desired processability in terms of, for example, viscosity, flexural strengths, solubility, adhesion to substrates, crosslinking, melting point, weight, adaptability to filler loading and the like. This is achieved by varying as desired the degree of self-protonation, the state of oxidation, and the type and degree of substituents on the polymer. Certain substituents may be preferred for the facilitation of desired processing parameters, such as increasing or decreasing solubility, altering extrusion parameters (rheology), achieving a specific viscosity, and the like. Derivatization is also useful for achieving compatibility with a copolymer, facilitating the tunability of the sulfonated polyaniline composition for nonlinear optics applications, and for specific wavelength absorption, such as microwave attenuation or a particular photoresponse.

In another aspect of the present invention, the dielectric loss of the sulfonated polyaniline polymeric compositions can be controlled by the design of the chemical composition of the sulfonated polyaniline polymer, the oxidative state of the polymer, and the degree of self-doping or self-protonation of the polymer. Thus, by the addition of electron-withdrawing or electron-donating groups to the nitrogen atoms and/or the $C_6$ rings of the leucoemeraldine, emeraldine, or pernigraniline sulfonated polyaniline compositions, the dielectric loss tangent can be varied. The dielectric loss tangents can be varied from $10^{-2}$ to approximately 20 by varying the form of the sulfonated polyaniline, the degree, site and type of substituents. In the prior art, carbon filled silicone rubber or carbon filled epoxy paints or carbon bonded to fabric produce non-magnetic dielectric losses at microwave frequencies. One embodiment of the present invention for attaining maximum dielectric loss is the emeraldine salt, wherein y is in the range of from approximately 0.4 to 0.6 and the protonation is approximately one proton per imine nitrogen, i.e., $[H^+]/[-N=]$ is equal to approximately one.

The addition of electron-withdrawing or electron-donating groups to the sulfonated polyaniline composition can facilitate the design of a polymeric material with desired absorption and transmission bands. The electron-withdrawing or electron-donating group can be present on the $C_6$ rings or the nitrogen atoms of the sulfonated polyaniline composition at any desired percentage of the available sites. Known electron-donating groups to be substituted onto the $C_6$ ring and operative in the present invention can include, but are not limited to, $-OCH_3$, $-CH_3$, $-C_2H_5$, halogens (electron-donating by way of a resonance effect), $-NR_2$, $-NHCOR$, $-OH$, $-O^-$, $-SR$, $-OR$, and $-OCOR$, wherein R is a $C_1-C_8$ alkyl, aryl or aralkyl. These groups or atoms possess one or more unshared electron pairs on the atom adjacent to the ring. Known electron-withdrawing groups can include halogens (electron-withdrawing by way of an inductive effect), $-NO_2$, $-COOH$, $-COOR$, $-COR$, $-CHO$, and $-CN$, wherein R is a $C_1-C_8$ alkyl, aryl or aralkyl. Thus, the addition of electron-donating groups to the rings of sulfonated polyaniline augments the charge delocalization. The added opportunities for resonance stabilization of the pi to pi* excited state provided by electron-donating groups causes a lowering in the requirement for excitation energy, and thus a decreased frequency (longer wavelength) of absorption. Conversely, the addition of electron-withdrawing groups diminishes the opportunities for resonance stabilization, causing an increase in the requirement for excitation energy, and thus an increased frequency (shorter wavelength) of absorption. Thus, for example, protonation of $-NH_2$ changes it to $-NH_3+$; this group no longer has an unshared pair of electrons to participate in charge delocalization. Alteration of $-OH$ to the ion, $-O^-$, provides further opportunity for participation of unshared electrons on oxygen in charge delocalization. Thus, the change of H to $NH_2$ is bathochromic; $NH_2$ to $NH_3+$ is hypschromic; OH to $O^-$ is bathochromic; and both of the changes, OH to $OCOCH_3$ and NH to $NHCOCH_3$ (acetylation), are hypsochromic.

In this manner, a sulfonated polyaniline composition is prepared which when produced in a flexible sheet form or when it is coated onto a flexible substrate can be used to absorb elecromagnetic radiation. Thus, a means of rendering an object undetectable to electromagnetic radiation such as radar is produced by the present invention by draping over the object the flexible sulfonated polyaniline film or the coated flexible substrate, such as a cloth fabric or fishnet. Furthermore, by coating elecromagnetic radiation-absorbing sulfonated polyaniline compositions onto fibers, and then producing woven or non-woven fabrics from the coated fibers, cloth or clothing which is radiation absorbing can be produced. In another embodiment, fibers of sulfonated polyaniline itself or a derivative thereof, or fibers of sulfonated polyaniline copolymerized with another polymer can be drawn or extruded and subsequently woven into electromagnetic radiation absorbing fabric, garments, coverings, and the like. In this manner radar absorbing clothing can be produced.

Sulfonated polyaniline absorbs electromagnetic radiation in the visible spectrum, in the infrared range, and in the ultraviolet range. Thus, the present invention further relates to a method of absorbing infrared, visible, or ultraviolet waves, comprising exposing the sulfonated polyaniline to infrared, visible or ultraviolet waves, whereby the infrared, visible, or ultraviolet waves are absorbed by the sulfonated polyaniline. The present invention also relates to a method for absorbing microwave radiation comprising exposing sulfonated polyaniline to microwave radiation, whereby the microwave radiation is absorbed by the sulfonated polyaniline.

The present invention also relates to a method of electromagnetic shielding. A thin film of sulfonated polyaniline within, for example, the walls of television sets, computers, electronic machinery, and places for the storage of electronic data, such as computer semiconductor memories, will effectively absorb continuous and intermittent electromagnetic radiation from wires, coils, cathode ray tubes and the like. Protection against unwanted or unknown electronic surveillance of rooms can be achieved by the application of polyaniline to the walls, floors, and ceiling. Similarly, electrical wires can be shielded by the incorporation of a layer of sulfonated polyaniline material into the plastic insulator coating on the wires with the advantage of grounding and static free property.

In addition, sulfonated polyaniline can be used to make a remote thermal switch by exposing the sulfonated polyaniline composition to microwave radiation. The sulfonated polyaniline composition absorbs the radiation, which heats up the sulfonated polyaniline, which in turn, can trigger a thermocouple placed in contact with the sulfonated polyaniline composition. Upon removal of the source of microwaves, the sulfonated polyaniline composition will cool and cause the thermocouple to switch back. By this manner a thermal switch is produced.

The present invention also relates to a sulfonated polyaniline composition for absorbing electromagnetic radiation, wherein said electromagnetic radiation possess a wavelength generally in the range of from about 1000 Angstroms to about 50 meters, wherein the composition comprises a sulfonated polyaniline composition of the formula I, above, or a protonated salt thereof, where y is in the range of approximately 0.2 to 0.8, and the degree of protonation, i.e., $[H^+]/[-N=]$, varies from 0 through 1.

The present invention further relates to a method of applying heat to a substrate which comprising the steps of: (a) applying to a substrate a microwave radiation-absorbing sulfonated polyaniline composition, or a partially self-protonated salt thereof; and (b) exposing the microwave radiation-absorbing sulfonated polyaniline composition, for example, a partially self-protonated salt thereof, to microwave radiation, whereby the microwave radiation-absorbing sulfonated polyaniline composition, or the partially self-protonated salt thereof, absorbs the microwave radiation, resulting in the generation of thermal energy within the sulfonated polyaniline composition. This heat can be localized, transferred from the sulfonated polyaniline composition or the salt to a substrate and utilized to accomplish desired results, such as, but not limited to, joining of materials. Thus, two materials which have been placed in contact or close proximity with each other and in contact with a sulfonated polyaniline composition can be adhered to each other upon the exposure of the sulfonated polyaniline composition to sufficient microwave radiation to heat and thus melt or at least soften at least one of the materials to enable fusing. The frequency, duration and/or intensity of the microwave radiation necessary to achieve the desired adhesion of the two materials will vary depending on the nature of the materials to be adhered and on the degree and type of protonation and/or substitution, if any, on the sulfonated polyaniline. The preferred frequency of the microwave radiation to be absorbed by the sulfonated polyaniline compositions to thereby induce localized heating is from about $10^9$ Hz to about $10^{11}$ Hz. The sulfonated polyaniline composition can be applied to one or both of the materials in any pattern, such as a grid pattern, stripes, spots, or the like as desired. The sulfonated polyaniline can be applied via solution coating, adhesion of films, vapor deposition, extrusion of gels containing sulfonate polyaniline and other known application techniques.

In one embodiment of the present invention directed toward the adhering of two or more materials by the absorption of microwave radiation by sulfonated polyaniline, at least one of the materials to be adhered is a plastic. In another embodiment, one of the materials to be adhered is a silicate-containing material, such as, for example quartz or glass. In this manner, a plastic can be adhered to a glass fiber, such as an optical fiber, by means of exposure of the sulfonated polyaniline to microwave radiation.

Sulfonated polyaniline compositions can also be utilized to absorb radar waves possessing a wavelength in the general range of from about 0.01 cm to about 100 cm. The absorption of radar waves by the sulfonated polyaniline composition assists in rendering objects coated with the sulfonated polyaniline composition relatively invisible to radar detection. Therefore, the instant invention further relates to a method for absorbing radar waves comprising exposing a sulfonated polyaniline composition or a partially protonated salt thereof to radar waves whereby the sulfonated polyaniline composition or the salt thereof absorbs at least some of the radar waves. The invention further relates to a method for reducing the detectability by radar of an object comprising applying to the object a sulfonated polyaniline composition or a partially self-protonated salt thereof in an amount sufficient to absorb at least some, and preferrably all, radar radiation to which the object may be exposed.

In one embodiment of the method for reducing the detectability by radar of an object it is desirable to coat the object in such a way as to produce a gradient of absorption to minimize reflectance. Such a gradient of sulfonated polyaniline material can be achieved by varying the degree of self-protonation of the polymer or the degree of substitution on either the $C_6$ ring or the nitrogen atoms or both with a chemical substituent such that an incoming radar beam first encounters a sulfonated polyaniline composition with little or no self-protonation, i.e., a material with limited absorption of radiation. As the beam further advances along the gradient of sulfonated polyaniline material covering the object, the beam encounters sulfonated polyaniline polymer with continually increasing degrees of self-protonation, and hence increasing degrees of electromagnetic absorption. The gradient of self-protonation can be controlled through the gradient of sulfonation. In this manner, little or no reflection of the beam is produced and the object is not detectable by a radar wave reflection.

The present invention further relates to a method of electrochemical switching of the polymeric state of a sulfonated polyaniline composition. By contacting the sulfonated polyaniline composition with an electrolyte, electrochemical switching of the polymeric state can be significantly accelerated, being accomplished on a time scale of approximately $10^{-5}$ seconds. By contacting the sulfonated polyaniline composition with a solid electrolyte, electrochemical switching of the polymeric state can be even further accelerated, being accomplished on a time scale of less than approximately $10^{-7}$ seconds particularly since only protons need migrate in the sulfonated polyaniline compositions. For electromagnetic radiation absorption, such as the absorption of microwave radiation, electrochemical switching of the polymeric state can turn the polymeric material from radiation transparent to radiation absorbing, or vice versa, depending on the nature and direction of the electrochemical switching. For non-linear optics, electrochemical switching can change the important absorption and/or transmission bands for the probe and modulator beams, such as for example, in switching from the emeraldine base form to the emeraldine salt form of sulfonated polyaniline. The range of the absorption bands for the base and the salt can be shifted bathochromically (i.e., shifted to longer wavelengths) or hypsochromically (i.e., shifted to shorter wavelengths) as may be desired according to the characteristics of the available probe beam, the available modulator beam, or the available detector or sensor, or any combination thereof.

Sulfonated polyaniline compositions can also be used as a photoactive switch by manipulation of the index of refraction of the sulfonated polyaniline compositions. The extremely rapid photoresponse of the sulfonated polyaniline polymer, makes such polymer useful in nonlinear optical devices. The time dependence of the photo bleaching of the polymer is on the order of picoseconds. For example, the application of a laser beam of wavelength 6200 Angstroms (2.0 eV) to sulfonated polyaniline polymer produces significant photoinduced bleaching (i.e., increased transmission) in broad energy bands of 8,265 Angstroms to 4,590 Angstroms (approximately 1.5 eV to 2.7 eV) and again at 3,760 Angstroms to 2,880 Angstroms (approximately 3.3 eV to 4.3 eV). Simultaneously laser beam photoinduced absorption (i.e., decreased transmission) for sulfonated polyaniline occurs at 24,800 Angstroms to 8,265 Angstroms (approximately 0.5 eV to 1.5 eV) and from 4,590 Angstroms to 3,760 Angstroms (2.7 eV to 3.3 eV). Photoinduced absorption and bleaching occur in sulfonated polyaniline compositions in less than $10^{-12}$ seconds. These photoinduced changes in absorption correspond to changes in the index of refraction at these wavelengths. These changes in optical constants have broad application in nonlinear optical signal processing and optical communications, which according to the present invention, are useful as means to switch, modulate, multiplex, focus, and provide optical bistability for commercial systems.

Sulfonated polyaniline is therefore useful in nonlinear optical signal processing. For example, a thin film coating of sulfonated polyaniline can be applied to a phototransmissive substrate. In one embodiment of the present invention, a probe beam of light of a given wavelength is then propagated through the noncoated side of the substrate onto the coating at the critical angle to the sulfonated polyaniline such that the probe beam is wave-guided in the phototransmissive substrate. To activate the desired switching property of the sulfonated polyaniline coating, a pump beam of light, also called a modulator, of a different wavelength or some wavelength is applied to the coating through the coated or noncoated side of the substrate at a second angle such that the index of refraction of the sulfonated polyaniline composition is changed by the absorption by the sulfonated polyaniline of the electromagnetic radiation of the modulator beam. The wavelength of the modulator beam can vary widely, but is preferably within the range of from about 8265 Angstroms (1.5 eV) to about 4590 Angstroms (2.7 eV). The change in the refractive index of the sulfonated polyaniline composition coating alters the transmissive property of the sulfonated polyaniline and allows the probe beam to be refracted or otherwise modified by the sulfonated polyaniline coating. This refraction or other modification of the probe beam can, for example, be used to trigger a photocell, initiate or terminate an optical signal, encode information on the probe beam, or the like. By these means is produced a low cost, stable means of optical signal processing.

In an alternative embodiment, the beam to be modulated is refracted by the phototransmissive substrate and reflected off the sulfonated polyaniline coating on the backside of the substrate such that the beam is then reflected repeatedly between the front side of the substrate and the sulfonated polyaniline coated backside of the substrate. This reflection continues within the phototransmissive substrate until the modulating beam is caused to impinge on the sulfonated polyaniline coating, whereby the index of refraction of the sulfonated polyaniline coating is altered by the absorption of the electromagnetic radiation of the modulator beam, altering the propagation of the probe beam. In this manner the sulfonated polyaniline coating has acted as a switch which is reversibly controlled by the presence of the pump or modulating beam to increase or decrease the modulation (both intensity and direction) of the probe beam. Because of the very rapid photoresponse rate of the sulfonated polyaniline polymer, the refractive index can be altered at gigahertz to terrahertz rates, thereby providing a method for the rapid modulation of optical data signals.

In yet another embodiment, the beam to be modulated is caused to impinge upon a thin coating of sulfonated polyaniline which is on a phototransmissive substrate. A portion of the beam is reflected, the remainder refracted, transmitted, and partly absorbed. Application of a modulator beam at a second angle changes the index of refraction of the sulfonated polyaniline thereby altering the direction and the percentage of the probe beam transmitted and reflected.

Thus, the present invention further relates to a method of changing the refractive index of sulfonated polyaniline comprising (a) applying sulfonated polyaniline to a phototransmissive substrate; (b) applying a first beam of light of wavelength x at the critical angle y to the sulfonated polyaniline surface; and, (c) applying a second beam of light of wavelength z to the sulfonated polyaniline surface, whereby the second beam is absorbed by the sulfonated polyaniline changing the index of refraction of the sulfonated polyaniline, whereby the transmission of the first beam through the phototransmissive substrate is altered. The preferred wavelength x of the first or probe beam of light is dependent on the form of sulfonated polyaniline utilized. The preferred wavelengths will vary depending on the degree of self-protonation and oxidative state of the sulfonated polyaniline polymer and the nature of the substituents, if any, on the polymer. The preferred wavelength of the second or modulating beam is determined by the oxidation state, self-protonation level, and substituents of the polymer. For the leucoemeraldine polymer the preferred wavelengths of the probe beam are in the range of 24,800 Angstroms to 8,265 Angstroms (0.5 to 1.5 eV) and 4,590 Angstroms and 3,760 Angstroms 2.70 to 3.30 eV, with greater preferred modulator beam wavelength of 3,760 Angstroms to 2,880 Angstroms, 3.30 to 4.30 eV. For pernigraniline base, the preferred probe and modulator wavelength are similar to those of emeraldine base.

The photoswitching phenomenon can, according to the present invention, also be used to couple a light signal from one optical fiber to another optical fiber. The two optical fibers are positioned in close contact with each other and with a thin film of sulfonated polyaniline composition between them. The sulfonated polyaniline composition is then exposed to a modulating beam. The modulating beam changes the index of refraction of the sulfonated polyaniline such that "cross-talk" between two optical fibers is obtained. This allows the optical signal within either of the optical fibers to be coupled to the other fiber as desired, but without permanent physical alternation of either fiber. In addition, the coupling can be turned on and off as desired by the manipulation of the index of refraction and, because of the very rapid photoresponse rate of the sulfonated polyaniline polymer, the refractive index can be altered and coupling achieved at gigahertz to terrahertz rates.

In yet another embodiment of the present invention the sulfonated polyaniline composition can itself be utilized simultaneously as the phototransmissive material and a photoswitch without a phototransmissive substrate. Thus, a free standing sulfonated polyaniline polymer can be exposed to a first beam of light which will be transmitted through the sulfonated polyaniline with some attenuation. When the polymer is exposed to a second or modulator beam the refractive index and absorption coefficient of the sulfonated polyaniline polymer are altered, changing the intensity and angle of refraction of the beam transmitted through the polymer.

Another embodiment of the present invention is the use of sulfonated polyaniline compositions as a masking material over ultraviolet-curable polymers in the fabrication of positive resist and negative resist microelectronic devices and circuits. In the fabrication of certain positive resist and negative resist microelectronic devices and circuits, radiation curable polymers are deposited on conductive or semiconductive surfaces, such as silicon or doped silicon. A circuit pattern is then applied by means of photolithographic techniques and covered by ultraviolet-curable polymers in certain desired patterns. Ultraviolet radiation is then applied to the polymers to cure certain portions, after which the uncured portions are removed by solvent rinsing, for example. In this manner, patterns of cured polymer are provided on the conductive or semiconductive surfaces. By the present invention, sulfonated polyaniline can be applied to the curable polymer in a predetermined pattern such that the polymer beneath the sulfonated polyaniline pattern is desired to remain uncured upon exposure of the coated device or circuit to radiation. When the polymer is exposed to the radiation, the sulfonated polyaniline would absorb the ultraviolet radiation to thereby mask the polymer and prevent the cure in certain locations of the curable polymer beneath.

Thus, the present invention relates to a method for masking a radiation curable polymer applied to an electronic circuit or device comprising the steps of (a) applying a radiation-curable polymer or prepolymer to an electronic device or circuit; (b) applying to the radiation-curable polymer or prepolymer a sulfonated polyaniline composition; (c) exposing the device or circuit with the curable polymer or prepolymer and the sulfonated polyaniline composition to radiation sufficient to cure the curable polymer or prepolymer and whereby the sulfonated polyaniline composition absorbs some of the ultraviolet radiation; and (d) removing the sulfonated polyaniline and any uncured curable polymer or prepolymer. In a preferred embodiment of the invention, the curable polymer or prepolymer and the sulfonated polyaniline are independently deposited onto the surface of the electronic device or circuit by means of a solvent solution of each material, followed by the evaporation of the solvent. By "cure" herein is meant sufficient coreaction and/or crosslinking reactions have taken place to render the material a solid not easily removed by solvent.

The present invention further relates to various devices such as optical devices and microwave devices which utilize the features, characteristics and properties of the sulfonated polyaniline compounds which are described above.

The optical devices are useful in a range of electromagnetic spectrum at or near what is commonly referred to as light. These devices utilize the fact that the index of refraction of the sulfonated polyaniline compounds may be controlled by varying the intensity and wavelength of light radiated upon the sulfonated polyaniline compound. Thus, a pumping or modulating light at one or a broad band of frequencies may be used to modulate the index of refraction of the sulfonated polyaniline compound and thereby modulate light at another frequency. For example, this can be used for the coupling of the modulated light from one light transmissive medium to another or modulating its angle of departure from an interface between two light transmitting media. The spectral response of this photo effect is substantially changed as the compounds are more fully self-protonated.

The present invention also relates to devices which can operate as various types of light valves, as a phase velocity modulator and for controlling the angle of emission of a light beam. The light valves may be light switches turning the modulated beam on or off or variable valves which permit the intensity of the modulated light beam to be varied continuously over a range by varying the intensity of the modulating light beam. In a valve the modulating light beam pumps the electrons into higher energy bands causing the critical angle for a light beam incident upon an interface to be increased for some frequency bands and decreased for other bands as the intensity of the pump or modulating light increases.

Figure 9:
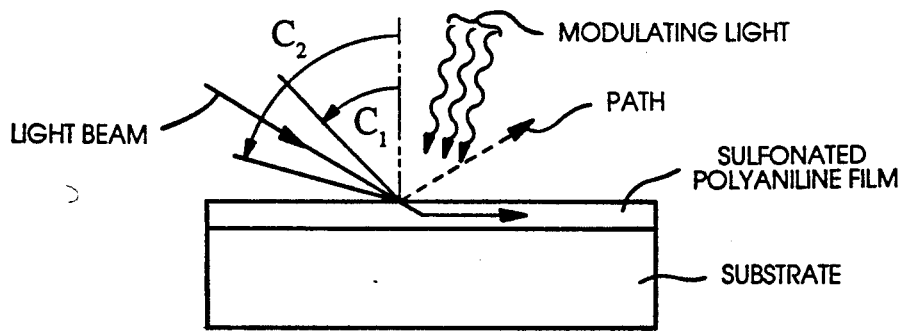
FIGS. 9–15 are schematic illustrations of alternative embodiments of the invention utilizing the optical properties.

FIG. 9 illustrates one such device. It has a substrate supporting a sulfonated polyaniline mass in the form of a film bonded to the substrate. The interface between the sulfonated polyaniline film and the air will have a critical angle of, for example, C1 when a modulating light does not pump the sulfonated polyaniline film and a critical angle C2 when the modulating light is intense. The angles are greatly exaggerated for illustration. In this example when the modulating light does not pump the sulfonated polyaniline film, a light beam which is incident upon the sulfonated polyaniline film at an angle greater than the critical angle C1 will not be substantially transmitted into the film but instead will be reflected along a path. However, when the modulating beam is turned on for pumping, the critical angle increases to angle C2 thus permitting the coupling of light from the beam into the film.

The critical angle is increased by an increase in the intensity of the modulating beam for some frequency ranges of incident modulated light and is decreased for others. Thus, the illustration of FIG. 9 continues to be accurate for all events. However, for some frequencies of incident, modulated beam, the critical angle when the sulfonated polyaniline is not pumped is the greater angle and then decreases to C1 as pumping energy is increased.

The result is that the incident light beam is always substantially equal to the critical angle being either slightly greater or lesser than the precise critical angle depending upon the incident beam frequency. Thus, the structure can be used to that increasing the intensity of the pumping, modulating beam will turn off the coupling of light from one transmission medium to another for some optical bands while turning on the coupling for other bands.

Figure 10:
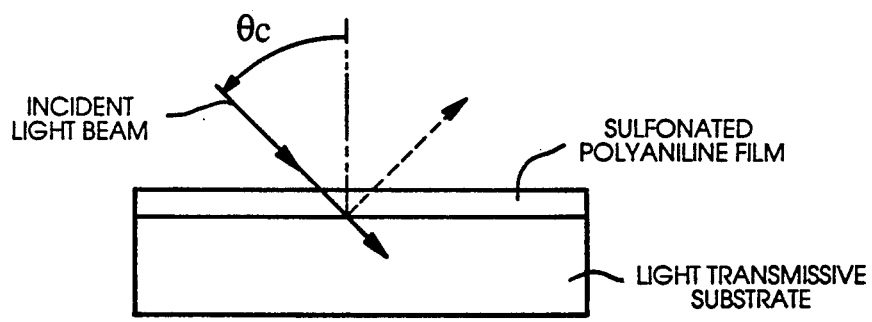

FIG. 10 illustrates a structure utilizing the same principles as illustrated in FIG. 9 but for coupling the light from a sulfonated polyaniline film into another light transmissive substrate. However, in the structure of FIG. 9, the interface at which the critical angle is important is the interface between the sulfonated polyaniline film and the light transmissive substrate. Thus, in the embodiment of FIG. 10 an incident light beam must be incident at an angle such that after it enters the sulfonated polyaniline film and is refracted along a different path it will approach the interface between the sulfonated polyaniline film and the transmissive substrate at substantially the critical angle, being greater or lesser than the critical angle by a smaller amount in accordance with the principles described in connection with FIG. 9. The coupling of light from the sulfonated polyaniline layer to the substrate layer is thus controlled by a modulating light. From the above description it is apparent that a beam in the opposite direction may also be similarly controlled.

Figure 11:

FIG. 11 illustrates another embodiment similar to the embodiment of FIGS. 9 and 10. In FIG. 11, however, an optical fiber light conductor has a sulfonated polyaniline layer upon at least a portion of its outer longitudinal surface. In this manner a pumping light can control the coupling of an incident light beam into the optical fiber light conductor.

Figure 12:
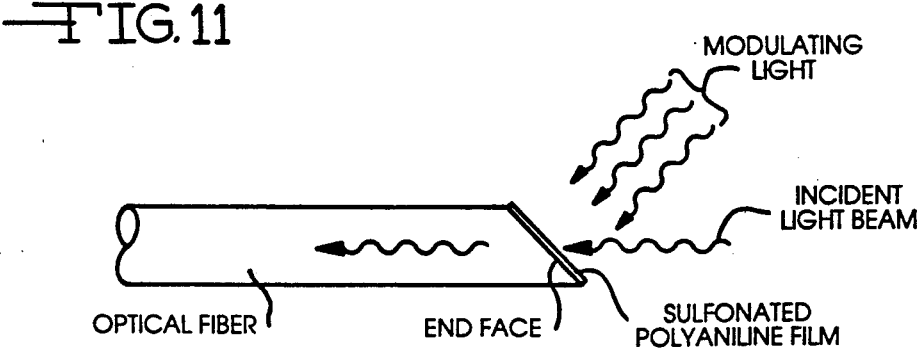

FIG. 12 illustrates an optical fiber having an endface which is lapped at substantially the critical angle for the interface between the optical fiber and a sulfonated polyaniline film coated on the lapped endface. An incident light beam may be directed upon the sulfonated polyaniline film parallel to the longitudinal optical axis of the optical fiber. The device operates on the same principles described in connection with FIGS. 9 and 10 except the light beam when coupled into the optical fiber enters along the longitudinal optical axis.

Figure 13:
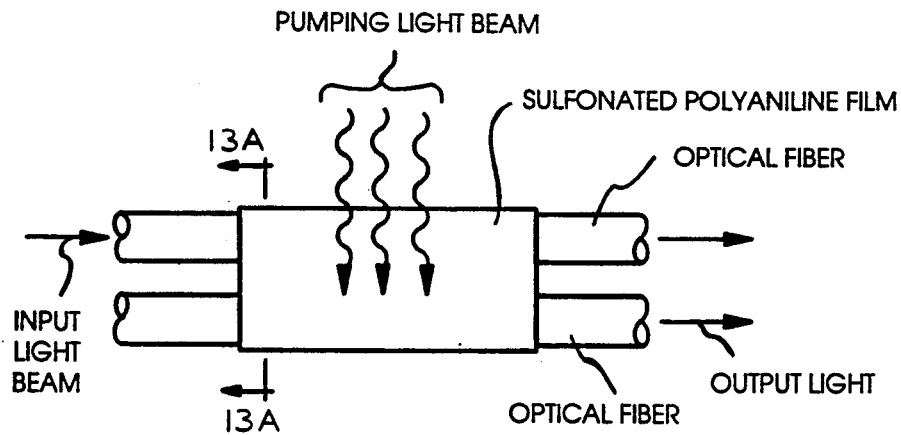
Figure 14:
Figure 15:
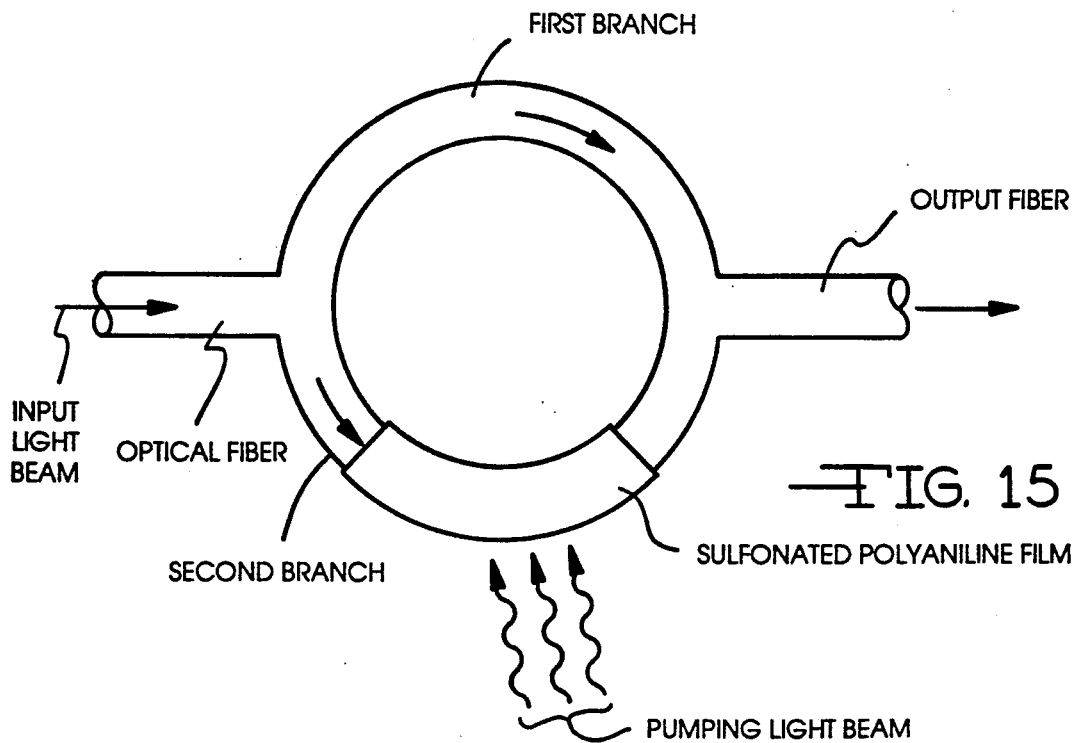

FIGS. 13 and 14 illustrate yet another device in which a pair of optical fibers are controllably coupled together by an interposed sulfonated polyaniline film joining the two fibers. Together these form three light conducting media. An input light beam propagating along the first fiber enters the region along which the sulfonated polyaniline is distributed. The coupling of light into the sulfonated polyaniline and into the second optical fiber is controlled by a pumping beam so that some of the light from input light is coupled into the second optical fiber to provide an output light. FIG. 15 illustrates a Mach Zehnder interferometer made up of light conductors in which an input light beam arrives in an optical fiber and is divided into a first branch and a second branch. These two branches are recombined at the optical output fiber. In accordance with the principles of the prior art Mach Zehnder interferometer, if the two beams arrive in phase in the output fiber they constructively interfere and the light beam and any associated signal continues along the path. However, if the beams destructively interfere, the light beam is destroyed. By variably controlling or altering the phase velocity through the second branch, the relative phases of the two light signals recombining at output optical fiber may be controllably varied between constructive and destructive interference.

While the Mach Zehnder interferometer is old and known, we have found a new manner of controlling the phase velocity in the second branch. The second branch is coated with a layer of the photo responsive sulfonated polyaniline film. A variable intensity pumping light for modulating the index of refraction of that layer is used to control the phase velocity of the light through the second branch. Thus, varying the intensity of the modulating or pumping light changes the phase velocity in the second branch and therefore changes the phase relationship between the two arriving signals in the output fiber.

The microwave devices of the present invention arise because we have discovered that a highly self-protonated emeraldine salt polymer has a high dielectric loss which we attribute to its combination of a modest conductivity and a high dielectric constant. The loss tangent, a quantitative indication of the energy loss in the polymer, is a function of the self-protonation level of the polymer and increase as the self-protonation level increases reaching a maximum at complete 50% protonation. Very importantly, the self-protonation level may be controlled as described above in the synthesizing of the material and also may be varied by changing the potential by means of an electrochemical cell. This permits the polymers to be made with a variety of selected loss tangents and further permits the loss tangents of the polymers to be variably controlled in a variety of useful devices. For example, the microwave properties may be turned on and off or varied over a range.

Figures 16, 17:
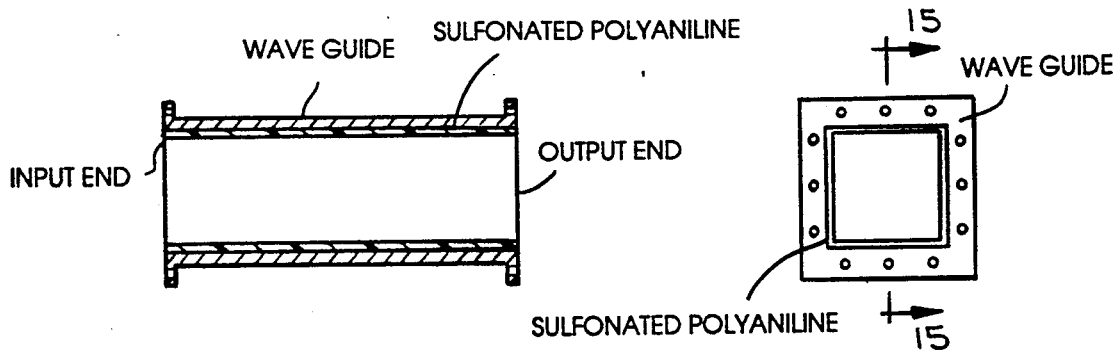
FIGS. 16–19 are schematic illustrations of waveguides utilizing the microwave absorption properties of the invention for absorbing microwaves propagated through the waveguide.

In FIGS. 16 and 17 a layer of self-protonated sulfonated polyaniline is bonded to the interior walls of a wave guide. As the microwave propagates from an input end to an output end, it is attenuated in the sulfonated polyaniline layer. This layer may be formed with a continuously changing self-protonation level along the propagation axis of the wave guide to provide a selected self-protonation gradient and therefore loss gradient between the input end and output end. This gradient can be contoured to minimize reflections where the propagating microwave encounters the transition from an absence of sulfonated polyaniline layer to the presence of the layer. Additionally, the layer may be geometrically formed to gradually taper to a greater thickness as the microwave propagates from the input end to the outlet end.

Figure 18:
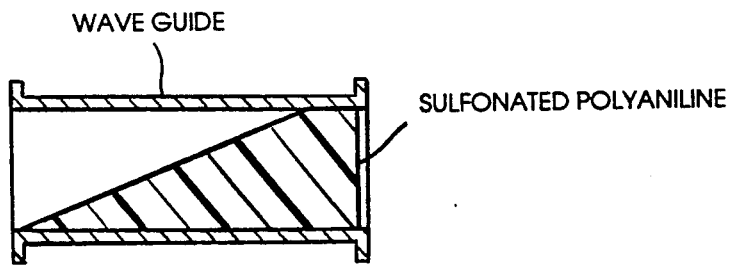

FIG. 18 illustrates a similar wave guide having a mass of sulfonated polyaniline so that it has a geometrical configuration providing an increase in thickness, that is an increase in its cross-sectional area in planes perpendicular to the axis of propagation.

Figure 19:
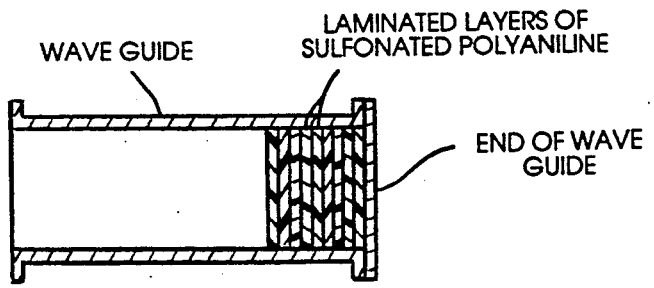

FIG. 19 illustrates another embodiment of the invention in which the sulfonated polyaniline mass is positioned within the interior of a wave guide and also extends between its walls. In the interior of the embodiment of FIG. 19 there is positioned a plurality of laminated layers of sulfonated polyaniline each layer having a different self-protonated level. This structure is particularly suitable for terminating an end of a wave guide in a manner to prevent reflections. Other circuitry may be used to direct unwanted microwave energy, for example, into the illustrated wave guide where it can be effectively attenuated. In order to minimize reflections, as described above, the layers initially encountered by the incoming microwave are the least self-protonated so they are the less absorptive. The layers become increasingly more self-protonated and therefore more absorptive as they are positioned closer to the end of the wave guide. Preferably, the average gradient of the variation in self-protonation and therefore in the variation in absorption is a monotonically increasing function of distance along the propagation axis.

Figure 20:
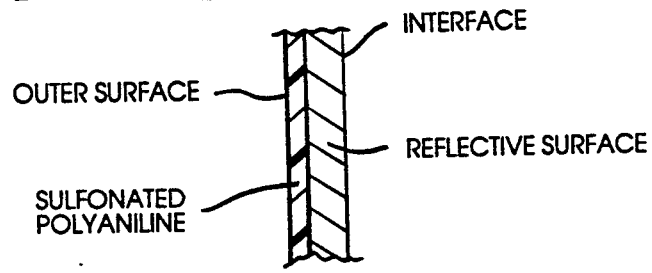
FIG. 20 is a schematic illustration of an alternative embodiment in which a surface is coated with a material embodying the present invention for preventing microwave reflections from the coated material.

Referring to FIG. 20, if it is desired to prevent reflections of microwave energy from a metallic or other reflective surface, the surface may be coated with a sulfonated polyaniline layer which is provided with a self-protonation gradient which increases from near 0% at the exposed outer surface to a much greater level, 50% for example, at an interface between the reflection surface and the sulfonated polyaniline layer.

Figure 21:
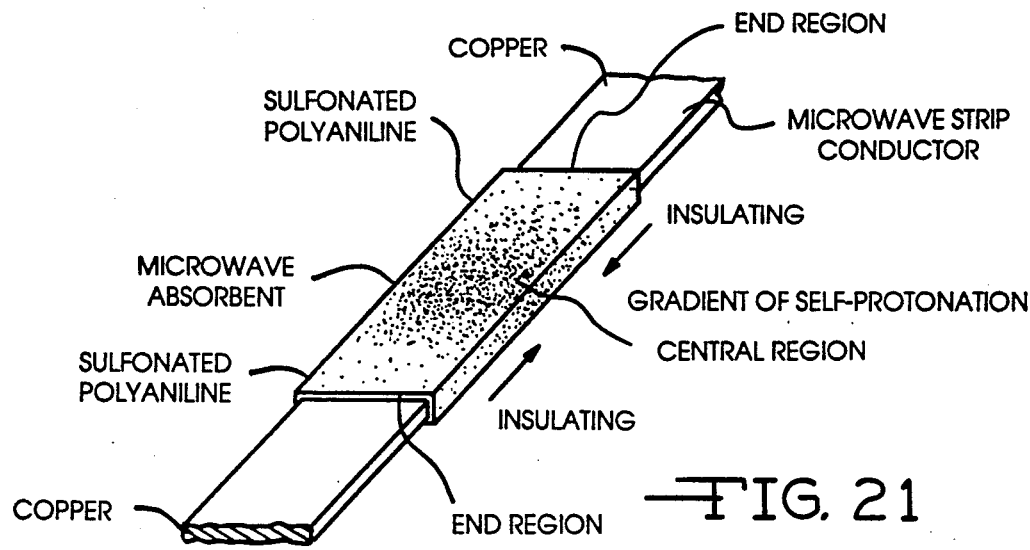
FIGS. 21 and 22 are schematic illustrations of alternative embodiments in which a microwave strip conductor is coated with material embodying the present invention.
Figure 22:
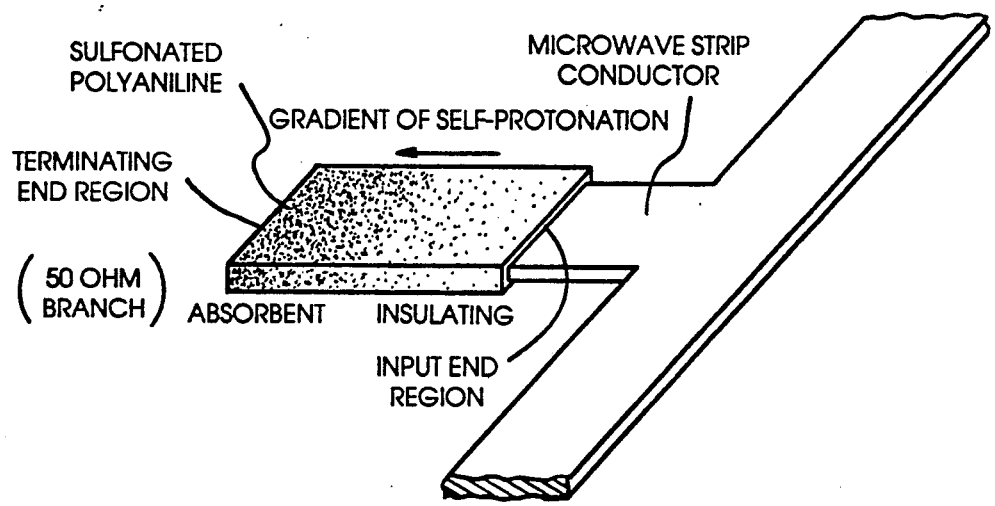
Figure 23:
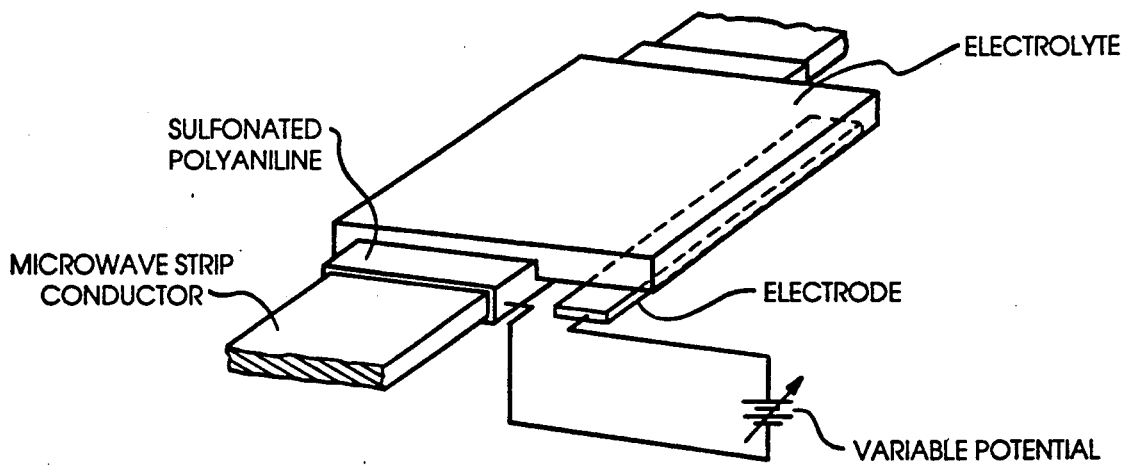
FIGS. 23 and 24 are schematic illustrations of microwave strip embodiments including an electrolyte for the controlled variation of the microwave absorbtion properties along the propagation axis of the microwave strip conductors.

Similarly, as illustrated in FIGS. 21, 22 and 23 the sulfonated polyaniline absorptive layer may be bonded to the exterior surface of a microwave strip conductor. This provides a convenient means for introducing attenuation onto a microwave strip conductor used in miniature or integrated circuits while minimizing reflections from it. For example, a sulfonated polyaniline layer can be synthesized as described above so that it has a variation in its self-protonation as a function of its position or distance along the axis of propagation of the strip conductor. The self-protonation varies from a minimum self-protonation level at its opposite end regions and increasing towards a central region to a maximum self-protonation at the central region.

FIG. 22 illustrates use of sulfonated polyaniline as a terminating absorber on an end of a branch of the microwave strip conductor. The sulfonated polyaniline layer is formed with a self-protonation gradient extending from a minimum self-protonation at its input end to a maximum self-protonation at its terminating end.

The gradual variation in the microwave loss tangent so that absorption increases gradually from the input end to the opposite end along the propagation axis may alternatively be accomplished or may be supplemented by increasing the thickness of the sulfonated polyaniline layer to also increase energy absorption.

One major advantage of sulfonated polyaniline materials used in the present invention is that their self-protonation and therefore their absorption or loss tangent may be controlled by an electrical potential. This feature may be utilized in many various embodiments of the invention but is illustrated in FIG. 23.

FIG. 23 illustrates a microwave strip conductor upon which a sulfonated polyaniline layer is positioned of the type illustrated in FIG. 21. The strip may, if desired, have a protonation or a thickness gradient. This layer, because it is also conductive, may also serve as one electrode of an electrochemical cell. It is connected to a variable potential. The other terminal of the variable potential is connected to another electrode of this electrochemical cell. A solid or liquid electrolyte is positioned between the electrodes. Thus, the application of the variable potential permits the potential of the sulfonated polyaniline to be varied, controlling or varying its self-protonation as a function of the potential and thereby varying its absorption or loss tangent. In this manner, the effect of the sulfonated polyaniline layer may be switched on and off by switching the sulfonated polyaniline between fully self-protonated and unprotonated states and may be varied to intermediate levels of self-protonation.

Figure 24:
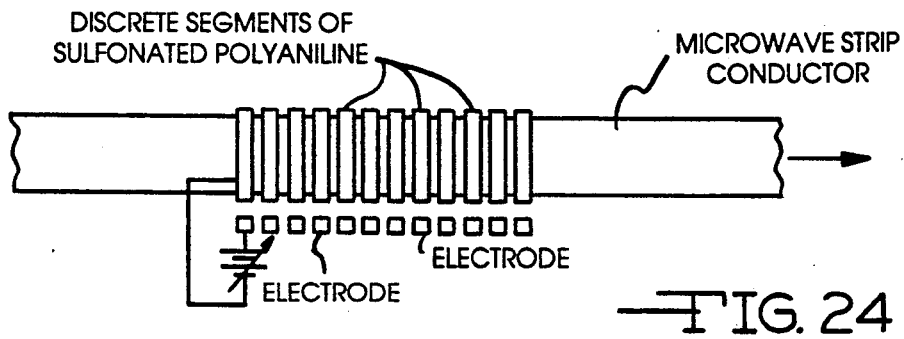

FIG. 24 illustrates a structure for controlling and varying the self-protonation gradient along a microwave strip conductor by forming the sulfonated polyaniline layer into a series of discrete segments along the axis of propagation of the microwaves. Each individual sulfonated polyaniline segment forms an electrode, of a separate electrochemical cell. Each of these cells has a second electrode, for example, and an interposed electrolyte like the electrolyte in FIG. 23 but separately associated with each individual electrochemical cell. A separate potential is applied for controllably varying the potential of each discrete segment of sulfonated polyaniline mass along the propagation axis so that its loss tangent may be independently varied. Different potentials may be applied to each of these discrete cells to controllably contour the self-protonation gradient which is desired for particular circumstances.

Figure 25:
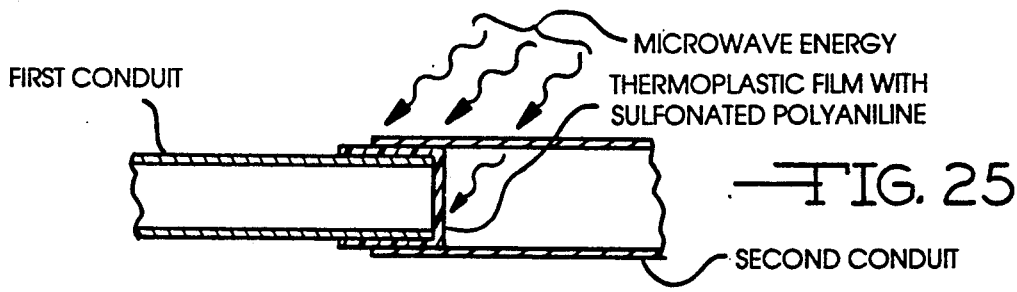
FIGS. 25 and 26 illustrate embodiments utilizing thermally responsive films which have materials embodying the present invention distributed within the film.
Figure 26:
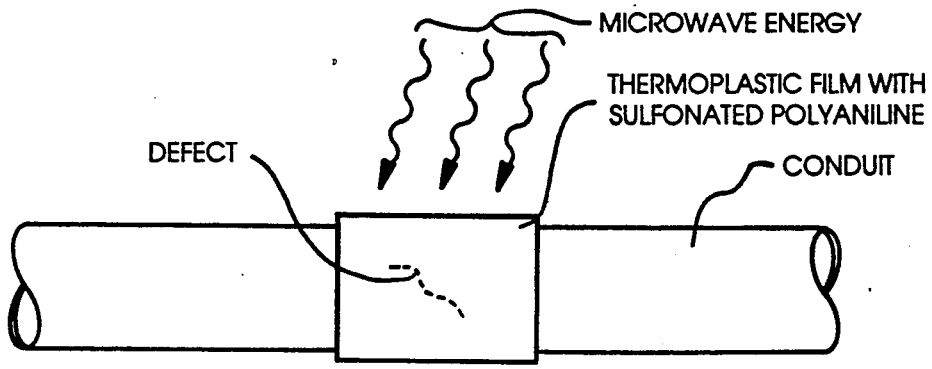

FIGS. 25 and 26 illustrate embodiments in which a thermally responsive film has microwave radiation absorbing self-protonated sulfonated polyaniline polymer in the emeraldine salt state distributed in the thermally responsive film. The term "distributed" is intended to include the various chemical techniques for distributing the active materials in a thermally responsive film material, this includes dispersing and copolymerization. This distribution of the microwave radiation absorbing polymer in the thermally responsive film permits the film to be activated by microwave energy rather than by radiation with infrared energy. This is particularly useful in electrically insulative environments in which the energy may be coupled specifically into the thermally responsive film without undue heating of surrounding structure and from a remote source.

For example, if the principal carrier film is a thermally deformable film such as thermoplastic film which softens and flows more easily when heated, it may be used to form a barrier or closure which can be destroyed from a remote position by irradiation with microwave energy. For example, FIG. 25 illustrates a conduit having a thermoplastic film with microwave radiation absorbing self-protonated sulfonated polyaniline salt polymer distributed within it to form a barrier between the conduits. This sealing film will block passage of fluids, for example, past the barrier formed by the film until the film is radiated by microwave energy causing the barrier to be heated, softened and eventually separate to open the passage.

The microwave radiation absorbing self-protonated sulfonated polyaniline salt polymer may also be distributed in or copolymerized with a conventional thermally activated shrink wrap film. For example, FIG. 26 illustrates a conduit having a defect or crack. A thermoplastic film with microwave radiation absorbing self-protonated sulfonated polyaniline salt polymer distributed with it is loosely wrapped around the conduit and the film is then irradiated with microwave energy causing the sulfonated polyaniline polymer to absorb the microwave energy convert it to heat thereby heating the film and activating its shrink properties.

The microwave absorptive sulfonated polyaniline film can be advantageously used for shielding objects as mentioned above and is particularly useful for shielding a plurality of electrical conductors to form a shielded cable. The sulfonated polyaniline shield not only prevents electromagnetic energy from entering the cable and thereby coupling noise into the conductors and prevents electromagnetic energy from exiting the cable but additionally because the sulfonated polyaniline is also conductive, the outer conducting sulfonated polyaniline shield may also be used to ground an electronic device to which it is connected. Thus, because the sulfonated polyaniline is also conductive, it may not only absorb rather than merely reflect the microwave energy but it may also conduct current to maintain an electrical apparatus at a ground potential.

The ability to permanently alter at will the absorption charteristics of sulfonated polyaniline through the application of light or electrochemical potential provides a powerful technology for use in information storage.

Transmission characteristics of the photoinduced absorption in sulfonated polyaniline are also dependent upon the writing laser input intensity. That is, the amount of photoinduced absorption is proportional to the intensity of the writing laser. This ability to "stack" the transmission characteristics of the shifted photoabsorption spectrum of sulfonated polyaniline provides the capability to "stack" information storage at one given bit location on a storage unit. Thus, the read lasers can be utilized to correspond to the laser input intensity to read three-dimensionally at one bit location of the storage system.

Figure 27:
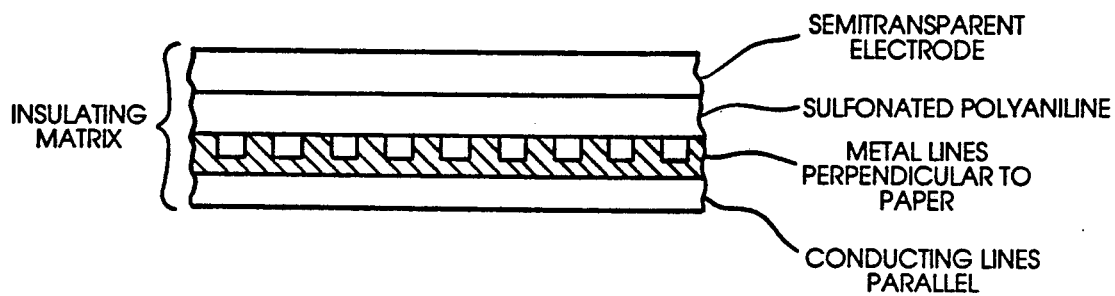
FIG. 27 is a schematic illustration of a configuration for use in the present invention for electrochemical bit-wise write or erasure of stored information.
Figure 28:
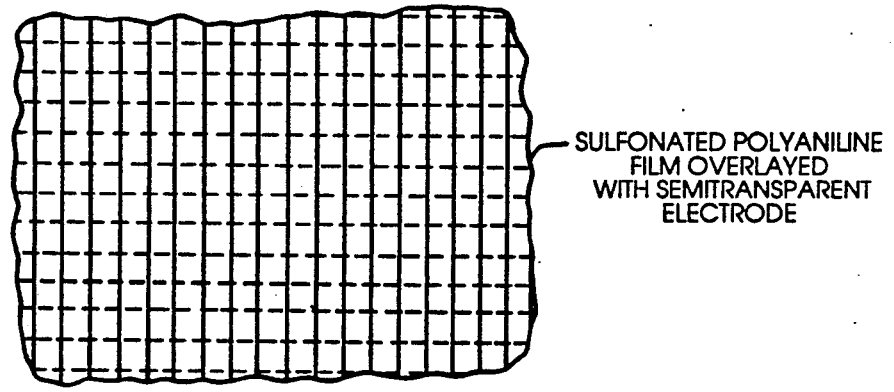
FIG. 28 is a top view of the schematic illustration of FIG. 26.

Chemical or electrochemical erasure of the stored information in a total or bit-wise manner is possible by temporary conversion of the insulating forms of sulfonated polyaniline to the conducting form of the sulfonated polyaniline film. Similarly, if information storage is carried out using the long lived photoinduced absorption of the conducting forms of sulfonated polyaniline, then total or bitwise erasure can occur by chemical or electrochemical conversion to one of the insulating (leucoemeraldine, emeraldine or pernigraniline) forms of the polymer. Electrochemical conversion is achieved in a compact solid-state sandwich cell such as shown in FIG. 27 and FIG. 28. The sandwich cell incorporates a solid electrolyte such as polyethyleneoxide and at least one transparent or semi-transparent electrode. The electrochemical electrodes are arranged in two overlaid but electrically isolated raster-like arrays. Applying voltage to two electrically conducting strips that cross at bit element P would produce a large enough voltage to switch the spectral state of the polymer at that bit element P. Application of a voltage at only one such would be insufficient to switch the bit. In addition to enabling the electrical erasure or correction of individual bits written optically this also allows the use of electrical bit data to write to the polymer and subsequently bring rapid optical read of the stored information.

The temperature for erasure of the photoinduced information is one of sulfonated controllable by judicious choice of the N or ring substituent. For example, use of polyortho-toluidine and naphthal versions of sulfonated polyaniline in the emeraldine equivalent oxidation state polyaniline will provide stability to higher temperatures, likely exceeding room temperature. Hence, some of these derivative systems will be usable at room temperature, with erasure occurring above room temperature.

The sulfonated polyaniline medium used for information storage may also be combined in composite form with other polymers to blend mechanical and optical storage function. The density of optical storage is limited only by the diffraction limits of the writing and probing beams utilized. Assuming a wavelength of 500 nm ultimately of bit density of approximately 1 bit per 1 micron by 1 micron square or approximately $7.3 \times 10^{10}$ bit per 12 inch diameter disk is obtainable. Use of a shorter wavelength light or finer focusing technique leads to an even higher density of optical storage. This is 1000 times the information density available in current commercial techniques. This estimate is obtained assuming that each bit is either "on" (1, photoinduced absorption is present) or "off" (0, no photoinduced absorption present). Discriminating two levels of photoinduced absorption, for example reading each bit as 0, 1, 2, raises the total information storage capacity dramatically.

Figure 29:
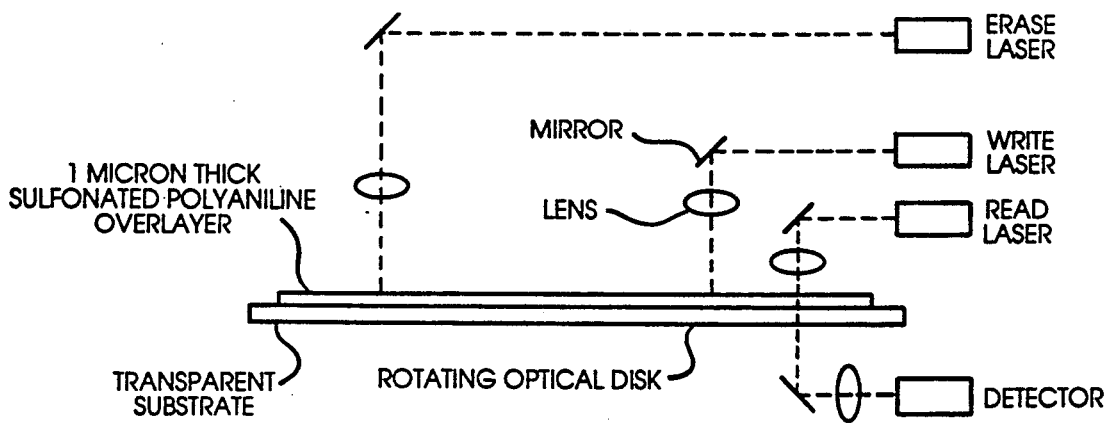
FIG. 29 is a side view of a schematic illustration of a sulfonated polyaniline containing optical disk device incorporating a rotating optical disk, laser and mirror for writing bits of information, and laser and mirror for reading the photoinduced information.

FIG. 29 is a schematic illustration of sulfonated polyaniline containing an optical disk device incorporating a rotating optical disk, laser and mirror for writing bits of information, and laser and mirror for reading the photoinduced information. A third laser (shown) and mirror may be added for bit-wise erasure purposes. It is noted that these mirrors may be replaced by self-focusing lenses, rotating polygon mirrors, or other available devices for directing the light emitting from these lasers to the desired bit track on the rotating disk. The detector moves in a coordinated fashion to lie under the bit being probed or alternatively the collection optics (including mirrors, etc.) track the bit being selected and guide the collective light to the detector. The output of the detector is discriminated to distinguish more than one level of information stored within the bit location.

The multi-level information storage aspect of the present invention can be alternatively achieved through the use of an optical disk having two oriented films of sulfonated polyaniline held at 90° relative orientation. Write, read, and erase light beams polarized parallel to the orientation direction of the top layer will record, read, and erase information on the top layer; light polarized parallel to the orientation direction of the bottom layer will be transmitted through the top layer and will record, read, and erase the bottom layer.

Figure 30:
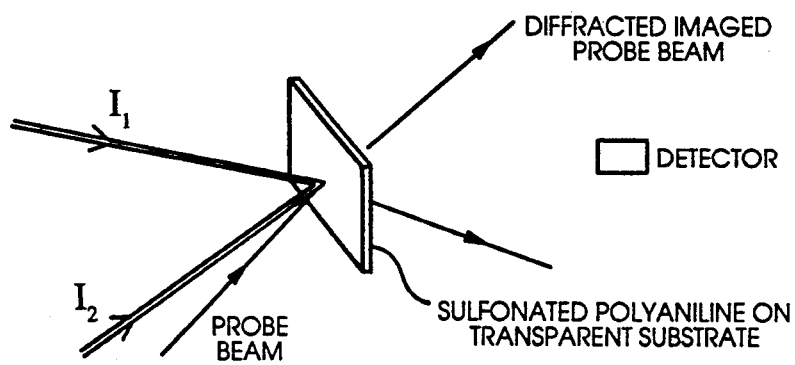
FIG. 30 is a schematic illustration of the use of sulfonated polyaniline film in holographic and photoinduced grating applications.

FIG. 30 is a schematic representation of the use of sulfonated polyaniline film to produce holographic images and photoinduced grating in a two-dimensional framework is shown. The two-dimensional framework is the sample configuration of a sulfonated polyaniline film supported by a transparent substrate. Two beams $I_1$ and $I_2$ interfere in the sulfonated polyaniline film to form an interference pattern or holographic image within the polymer.

Figure 31:
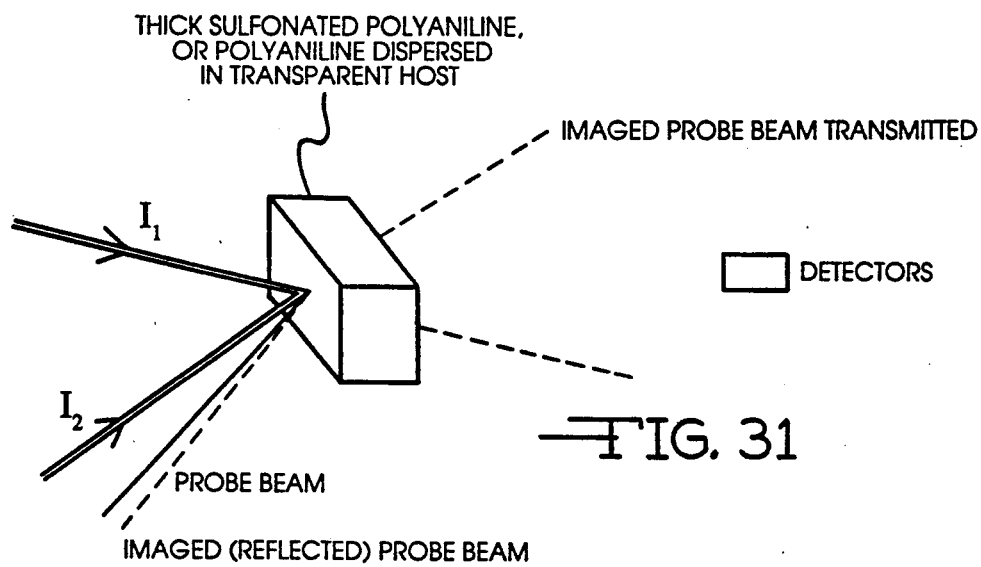
FIG. 31 is a schematic illustration of the use of a thick sample of sulfonated polyaniline or sulfonated polyaniline dispersed in a transparent host polymer in three-dimensional holographic and photoinduced grating applications.

FIG. 31 shows a three-dimensional holographic and photoinduced grating application by schematic illustration. A thick sample of sulfonated polyaniline or sulfonated polyaniline dispersed in a transparent host polymer such as kapton or polycarbonate is used. In this illustration two beams $I_1$ and $I_2$, interfere in the sulfonated polyaniline film to form an interference pattern or holographic image within the polymer.

The sulfonated polyaniline for use in photorefractive applications as envisioned in either FIG. 30 or 31 has an advantage over usual photorefractive materials such as $Bi_{12}SiO_{20}$ crystals in that the latter systems require applications of high voltage ($6kVcm^{-1}$) to the photorefractive material to maintain the photoinduced grating or holographic image. The sulfonated polyaniline material, because of the different microscopic mechanism involved, does not require the application of voltage to produce this high electric field, with concomitant advantages in design simplication, fabrication and processing simplication, and cost reduction.

While the invention has been disclosed in this patent application by reference to the details of preferred embodiments and examples of the invention, it is to be understood that this disclosure is intended in an illustrative rather than in a limiting sense, as it is contemplated that modifications will readily occur to those skilled in the art, within the spirit of the invention and the scope of the claims which follow.

TABLE 1

Elemental Analyses[1] of Chemically Synthesized Sulfonic Ring-Substituted Polyaniline

| sample | C | H | N | S | O[b] | Total | Formula |
|---|---|---|---|---|---|---|---|
| aniline (cal.) | 77.38 | 7.58 | 15.04 | — | — | 100 | $C_6H_7N$ |
| PAN (cal.) | 79.54 | 5.00 | 15.46 | — | — | 100 | $C_{12}H_9N$ |
| PAN (found) | 79.14 | 4.96 | 15.16 | — | — | 99.26 | $C_{12}H_9N$ |
| SPAN (cal.) | 55.16 | 3.47 | 10.72 | 12.27 | 18.37 | 100.00 | $C_{12}H_9N_2SO_3$ |
| SPAN (found) | 54.98 | 3.40 | 10.68 | 11.85 | 17.77 | 98.68 | $C_{12}H_9N_2S_1O_3{}^c$ |

[1]C, H, and N analyses were performed by Dr. R. Kohli at U. of Pennsylvania, S analysis was carried out by M-H-W Laboratories, Phoenix, AZ.
[b]Oxygen content was found by assuming three oxygen atoms for every sulfur atom.
[c]Ratio of H, N, and S to C corresponds to experimental value of $C_{12}H_{8.1}N_{1.98}S_{0.97}O_{2.9}$.

We claim:

1. A sulfonated polyaniline composition having a chemical composition of formula I

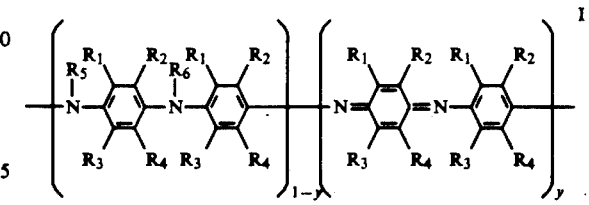

wherein $0 \leq y \leq 1$, $R_1$, $R_2$, $R_3$, $R_4$, $R_5$ and $R_6$ are independently selected from the group consisting of H, $SO_3^-$, $—SO_3H$, $—R_7SO_3^-$, $—R_7SO_3H$, $—OCH_3$, $—CH_3$, $—C_2H_5$, $—F$, $—Cl$, $—Br$, $—I$, $—NR_{7\,2}$, $—NHCOR_7$, $—OH$, $—O^-$, $—SR_7$, $—OR_7$, $—OCOR_7$, $—NO_2$, $—COOH$, $—COOR_7$, $—COR_7$, $—CHO$ and $—CN$, wherein $R_7$ is a $C_1$-$C_8$ alkyl, aryl or aralkyl group, and wherein the fraction of rings containing at least one $R_1$, $R_2$, $R_3$ or $R_4$ group being an $—SO_3^-$, $—SO_3H$, $—R_7SO_3^-$, or $—R_7SO_3H$ varies from approximately 20 percent to one hundred percent.

2. The composition as claimed in claim 1, wherein the sulfonated polyaniline composition is of molecular weight in the range of from approximately 300 (oligomers of sulfonated polyaniline) to in excess of 100,000.

3. The composition as claimed in claim 1, wherein $R_1$ is selected from the group consisting of $-SO_3^-$, $-SO_3H$, $-R_7SO_3^-$, and $-R_7SO_3H$ and $R_2=R_3=R_4=H$ and $y \sim 0.5$.

4. A process for producing the polyaniline composition of claim 1 comprising reacting a polyaniline polymer and $H_2SO_4$.

5. The process according to claim 4 in which the reaction is conducted at a temperature range of between about $-38°$ C. and $100°$ C.

6. The process according to claim 4 in which the reaction is carried out in air.

7. The process according to claim 4 in which the polyaniline polymer has a predetermined chain length which is not reduced in length during the reaction.

8. The process according to claim 4 in which a copolymer of polyaniline and sulfonated polyaniline is obtained by partially sulfonating the polyaniline polymer.

9. The process according to claim 8 in which the partial sulfonation of the polyaniline polymer comprises shortening sulfonation times and/or lowering sulfonation temperatures.

10. A composition for switching an electrochemical response between a conducting and a nonconducting state, wherein the electrochemical response is in the range of about $-0.2$ to about 0.8 V, wherein the composition comprises a sulfonated polyaniline composition of the formula I.

11. The composition as claimed in claim 1, wherein the composition is used in an electrochromic display.

12. The composition as claimed in claim 10, wherein the composition is used in an electronic switch.

13. The composition as claimed in claim 10, wherein the composition is used in a rechargeable battery.

* * * * *

UNITED STATES PATENT AND TRADEMARK OFFICE
CERTIFICATE OF CORRECTION

PATENT NO. : 5,137,991
DATED : Aug. 11, 1992
INVENTOR(S) : Arthur J. Epstein
Jiang Yue It is certified that error appears in the above—identified patent and that said Letters Patent is hereby corrected as shown below:

Column 24, line 28
"alternation" should be "alteration"

Column 34, line 15
"claim 1" should be "claim 10"

Signed and Sealed this

Twelfth Day of July, 1994

Attest:

BRUCE LEHMAN

Attesting Officer     Commissioner of Patents and Trademarks